United States Patent
Kataoka

(10) Patent No.: US 7,600,864 B2
(45) Date of Patent: Oct. 13, 2009

(54) INK SET, RECORDING METHOD USING THE INK SET, RECORDING DEVICE, RECORDING SYSTEM, AND RECORDED OBJECT

(75) Inventor: Shuichi Kataoka, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 504 days.

(21) Appl. No.: 10/494,682

(22) PCT Filed: Nov. 4, 2003

(86) PCT No.: PCT/JP03/14069

§ 371 (c)(1),
(2), (4) Date: Oct. 12, 2004

(87) PCT Pub. No.: WO2004/039900

PCT Pub. Date: May 13, 2004

(65) Prior Publication Data

US 2005/0041082 A1 Feb. 24, 2005

(30) Foreign Application Priority Data

| Nov. 1, 2002 | (JP) | 2002-320438 |
| Nov. 1, 2002 | (JP) | 2002-320439 |
| Nov. 1, 2002 | (JP) | 2002-320440 |
| Nov. 1, 2002 | (JP) | 2002-320441 |
| Nov. 1, 2002 | (JP) | 2002-320442 |
| Nov. 1, 2002 | (JP) | 2002-320443 |

(51) Int. Cl.
*C09D 11/00* (2006.01)
(52) U.S. Cl. .................. 347/100; 106/31.13
(58) Field of Classification Search .......... 347/100; 106/31.13
See application file for complete search history.

(56) References Cited

U.S. PATENT DOCUMENTS 5,493,321 A * 2/1996 Zwadlo ................. 347/131
5,597,856 A * 1/1997 Yu et al. ................. 524/227

(Continued)

FOREIGN PATENT DOCUMENTS

EP 0 933 406 8/1999

(Continued)

OTHER PUBLICATIONS

Patent Abstract of Japan of JP 2001-354886 dated Dec. 25, 2001.

(Continued)

*Primary Examiner*—Manish S Shah
*Assistant Examiner*—Laura E Martin
(74) *Attorney, Agent, or Firm*—Ladas and Parry LLP

(57) ABSTRACT

It is an object of the present invention to provide an ink set that has a wide color reproduction range, has high saturation, produces a glossy recorded image with no pronounced granularity caused by dot expression, greatly suppresses granularity caused by dot expression particularly when applied to a medium having a coating layer, and allows a recorded image with outstanding coloration to be obtained when applied to plain paper. The present invention provides an ink set comprising at least yellow ink (Y), magenta ink (M), cyan ink (C), and red ink (R), wherein the L* values in the Lab colorimetric system specified by CIE for aqueous solutions of each ink diluted 1000 times are within the following ranges. (Y): at least 89 and no more than 94, (M): at least 76 and no more than 93, (C): at least 74 and no more than 87, (R): at least 55 and no more than 74.

15 Claims, 6 Drawing Sheets

U.S. PATENT DOCUMENTS

| | | | |
|---|---|---|---|
| 6,221,150 B1 * | 4/2001 | Weber et al. | 106/498 |
| 6,290,762 B1 * | 9/2001 | Elwakil | 106/31.27 |
| 6,399,674 B1 * | 6/2002 | Kashiwazaki et al. | 523/161 |
| 6,517,630 B1 * | 2/2003 | Grandidier et al. | 106/498 |
| 6,648,954 B2 | 11/2003 | Uemura et al. | |
| 2002/0143079 A1 * | 10/2002 | Yamanouchi et al. | 523/160 |
| 2002/0196303 A1 * | 12/2002 | Koitabashi et al. | 347/21 |
| 2003/0035034 A1 * | 2/2003 | Fukumoto et al. | 347/86 |

FOREIGN PATENT DOCUMENTS

| | | | |
|---|---|---|---|
| EP | 1 048 702 | | 11/2000 |
| EP | 1153991 A1 * | | 11/2001 |
| EP | 1176177 A2 * | | 1/2002 |
| JP | 8-80665 | | 3/1996 |
| JP | 8-143803 | | 6/1996 |
| JP | 8-143804 | | 6/1996 |
| JP | 2000-351928 | | 12/2000 |
| JP | 2001-2962 | | 1/2001 |
| JP | 2001-354886 | | 12/2001 |
| JP | 2002-12810 | | 1/2002 |
| JP | 2002-19261 | | 1/2002 |
| JP | 2002060664 A * | | 2/2002 |
| JP | 2002-105352 | | 4/2002 |
| JP | 2002-138234 | | 5/2002 |
| JP | 2002-201401 | | 7/2002 |
| JP | 2002-241638 | | 8/2002 |
| JP | 2002-249683 | | 9/2002 |
| WO | 99-05230 | | 2/1999 |
| WO | 01-94482 | | 12/2001 |

OTHER PUBLICATIONS

English Abstract of WO 01/94482 dated Dec. 13, 2001.
Patent Abstracts of Japan and JPO computer English translation of JP 2002-105352 dated Apr. 10, 2002.
Patent Abstracts of Japan and JPO computer English translation of JP 8-143804 dated Jun. 4, 1996.
Patent Abstracts of Japan and JPO computer English translation of JP 8-143803 dated Jun. 4, 1996.
Patent Abstracts of Japan and JPO computer English translation of JP 2002-249683 dated Sep. 6, 2002.
Patent Abstracts of Japan and JPO computer English translation of JP 2002-201401 dated Jul. 19, 2002.
Patent Abstracts of Japan and JPO computer English translation of JP 2002-19261 dated Jan. 23, 2002.
Patent Abstracts of Japan and JPO computer English translation of JP 2002-12810 dated Jan. 15, 2002.
Patent Abstracts of Japan and JPO computer English translation of JP 2002-138234 dated May 14, 2002.
Patent Abstracts of Japan and JPO computer English translation of JP 2001-2962 dated Jan. 9, 2001.
"Developmental Technique of the Inkjet Media Printer." Technical Information Institute, Co., Ltd. (2001) $2^{nd}$ Edition, pp. 13-21 with concise English translation.

* cited by examiner

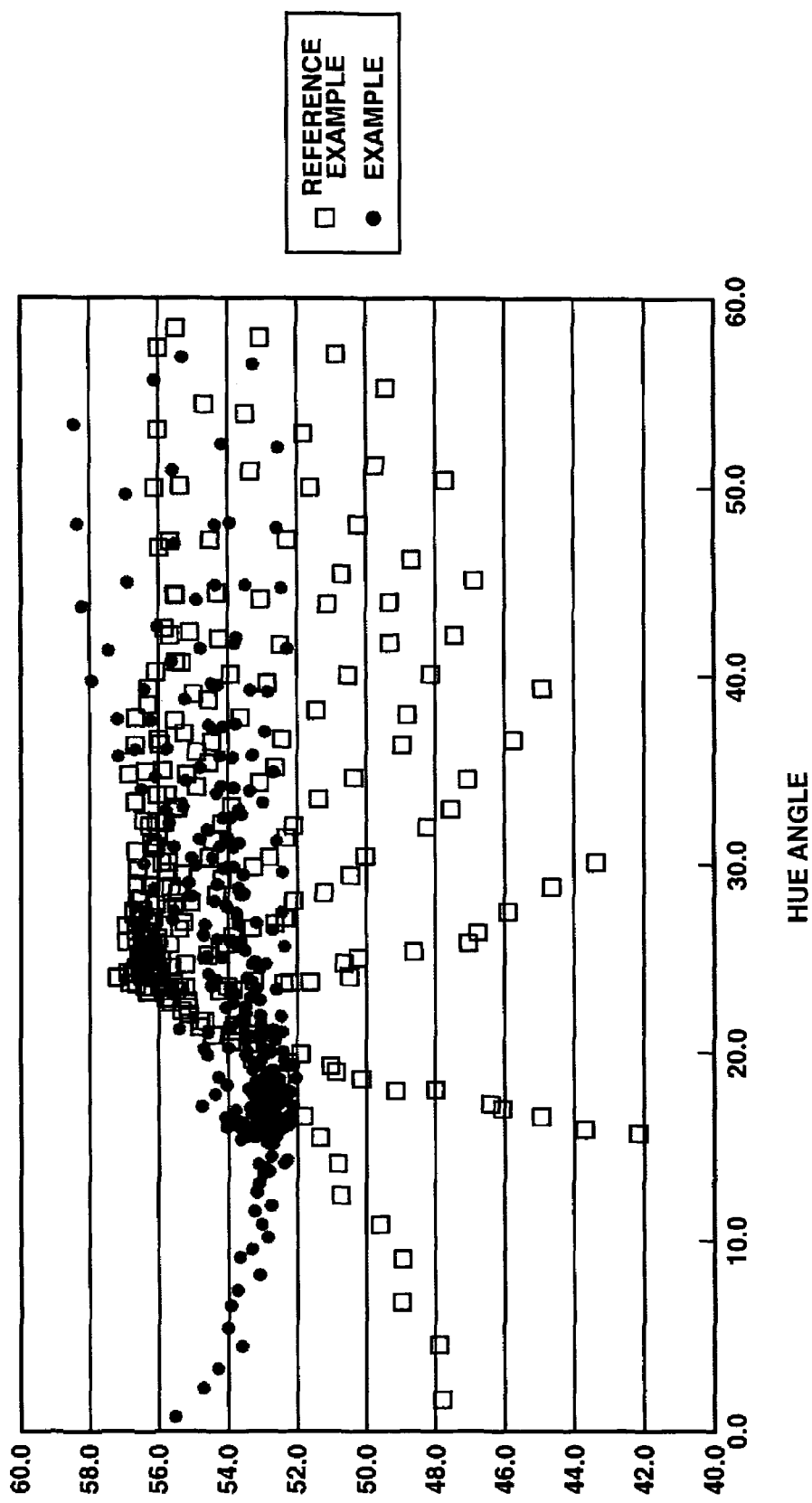

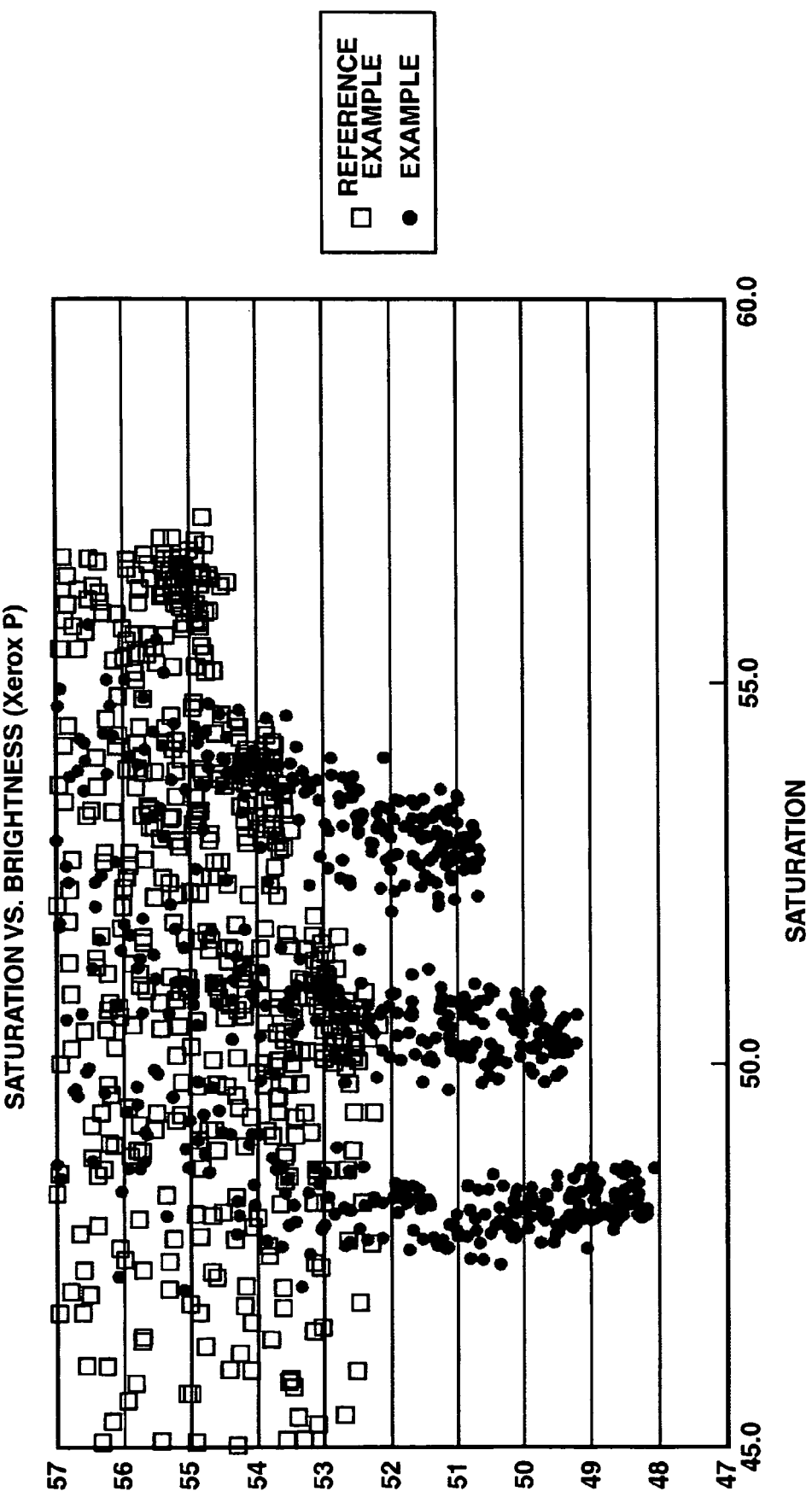

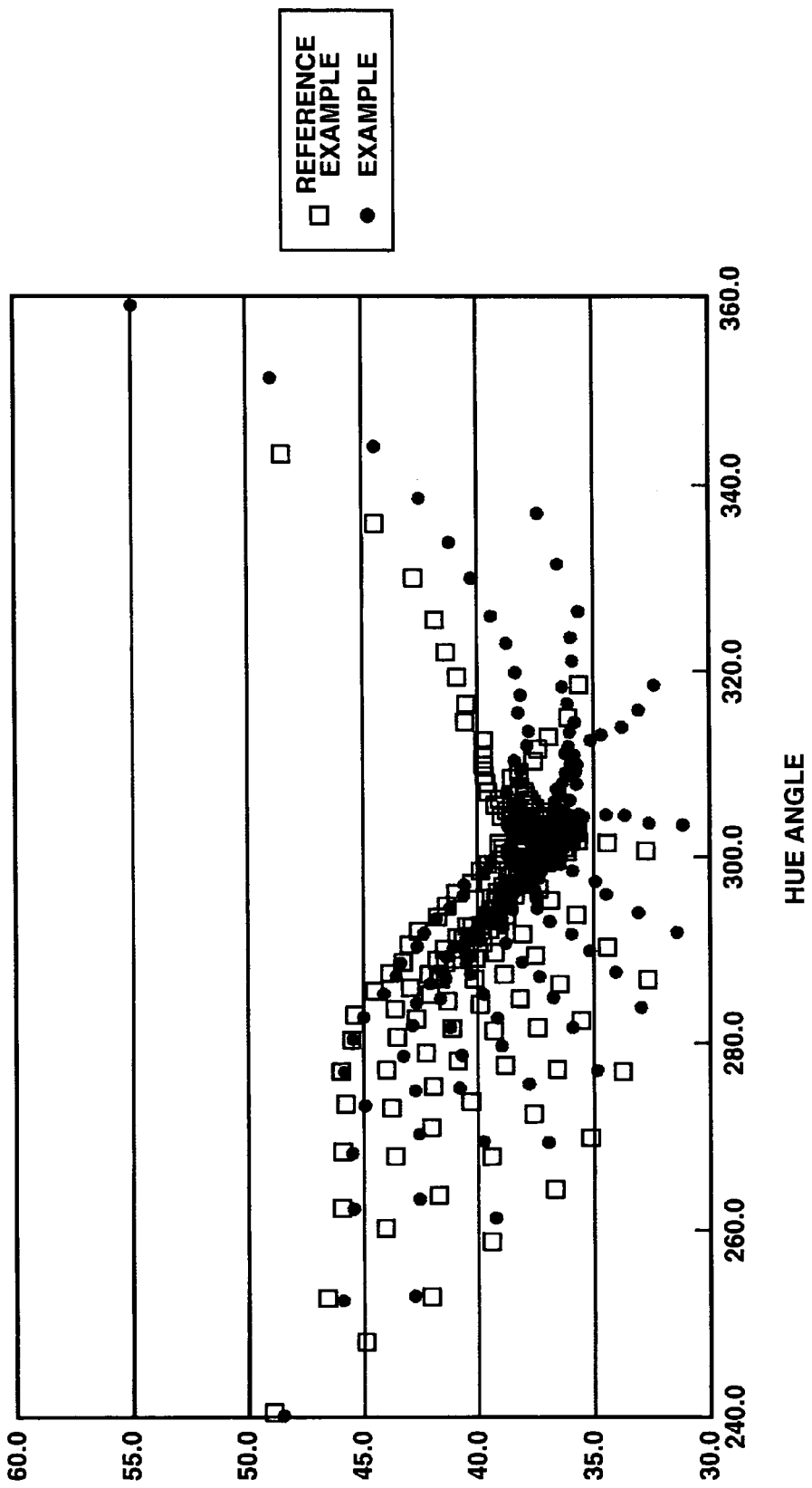

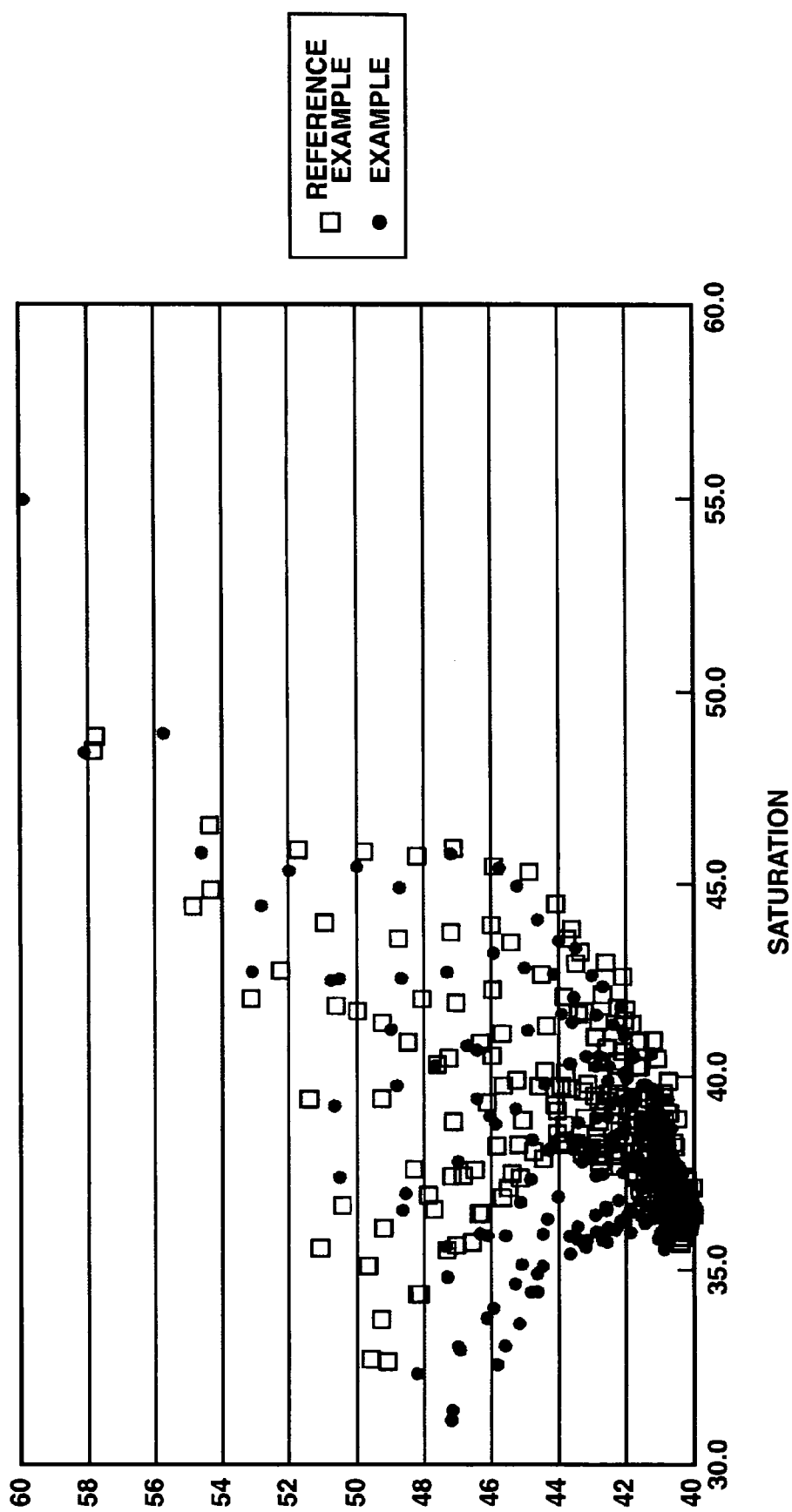

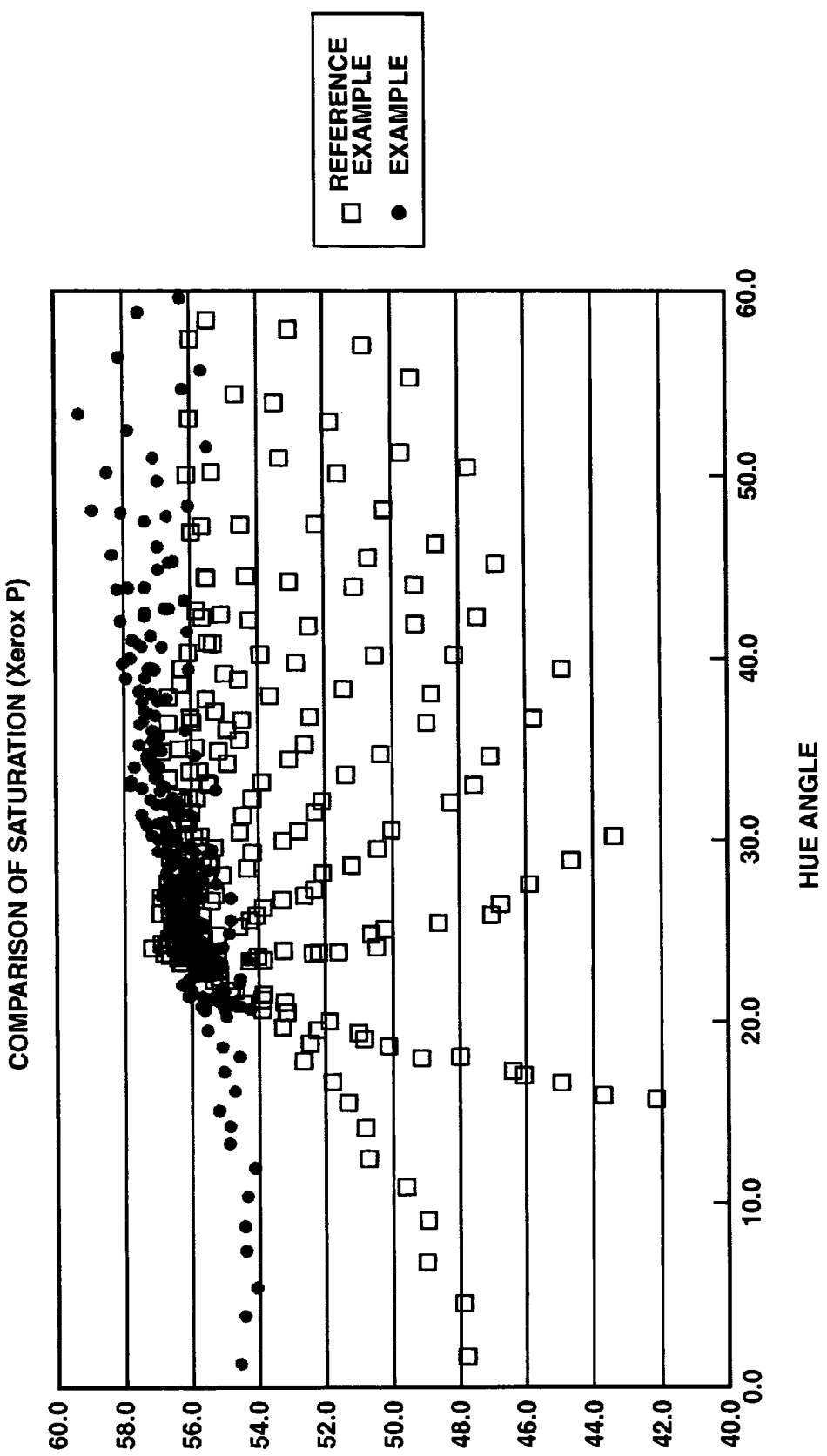

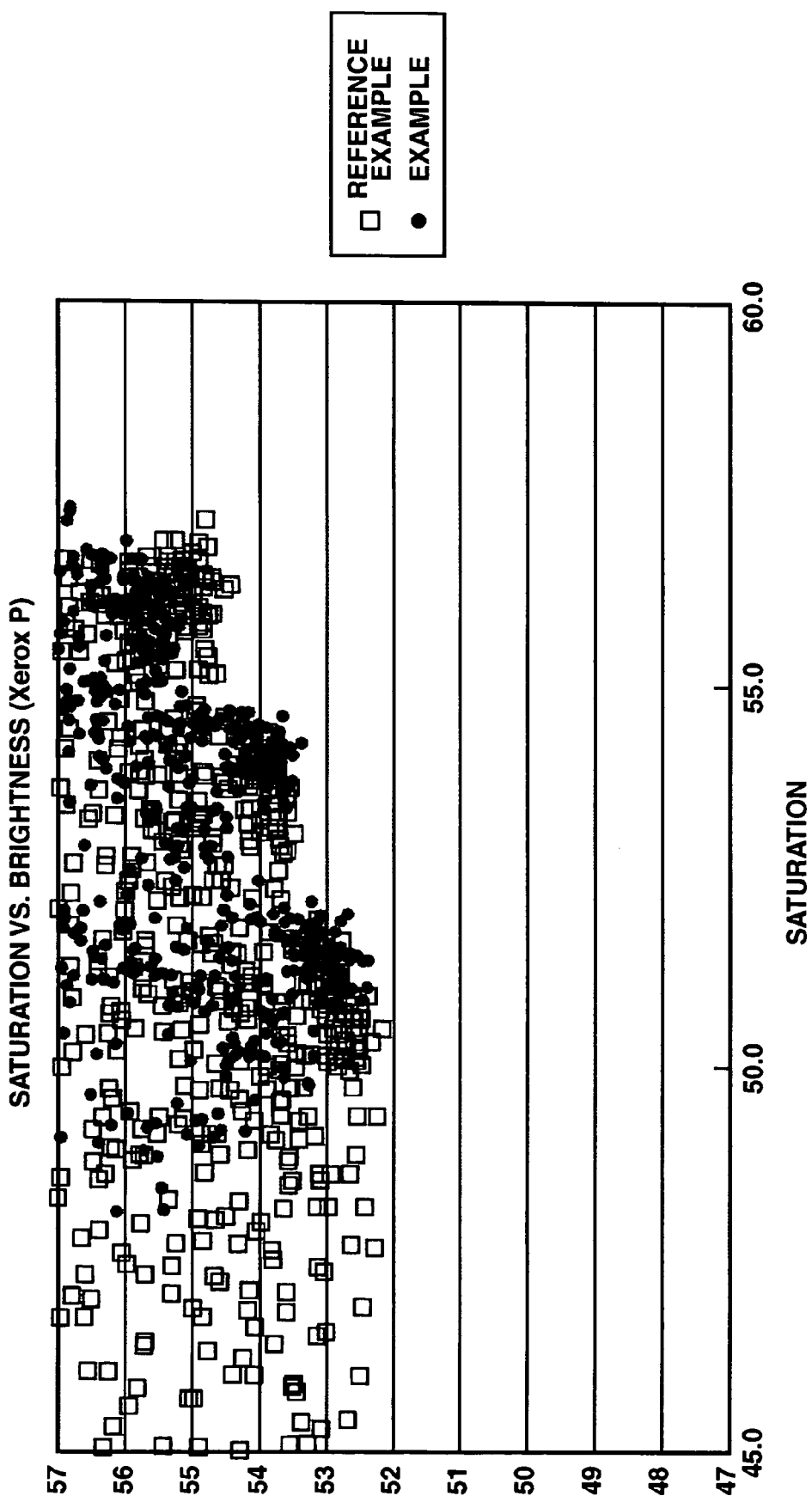

INK SET, RECORDING METHOD USING THE INK SET, RECORDING DEVICE, RECORDING SYSTEM, AND RECORDED OBJECT

CROSS-REFERENCES

This invention relates to an ink set comprising at least three colors of ink (yellow, magenta, and cyan), plus a red ink as a special color ink, and more particularly relates to an ink set with which can be obtained a glossy recorded image that has a wide color reproduction range, has high saturation, and has no pronounced granularity caused by dot expression, and in particular with which can be obtained a recorded image that has greatly suppressed granularity caused by dot expression when applied to a medium having a coating layer, and that has outstanding coloration when applied to plain paper, and to a recording method, a recording system, and recorded matter in which this ink set is used.

BACKGROUND

Pigment inks generally produce printed matter with better image fastness than do dye inks, and are used in a variety of applications that take advantage of this feature, such as wide-format color inkjet recording inks aimed at the signage and display market. In this color inkjet recording, various hues are usually expressed by using a three-color ink set comprising three colors of pigment ink (yellow (Y), magenta (M), and cyan (C)), which are the primary colors in subtractive color mixing, or a four-color ink set that adds to black (K) to these.

However, problems with the above-mentioned three- and four-color ink sets include a narrow color reproduction range and a decrease in the saturation of printed portions of secondary and higher color (mixed color portions), and such ink sets have yet to reach the level of being able to provide printed matter of high image quality comparable to that of silver halide photography, lithographic printing, and so on.

Some of the ways for dealing with the decrease in saturation have included increasing the pigment concentration of the various YMC inks, and increasing the amounts in which the YMC inks are applied to the recording medium, in an effort to boost saturation. All these methods, however, had drawbacks in that they led to a decrease in gloss and that a photographic look could not be obtained even when glossy paper was used as the recording medium. Also, to efficiently spread out the saturation with just three primary color (YMC) inks, a type of pigment intended for use with YMC inks having ideal spectral characteristics suited to subtractive color mixing has to be selected, and furthermore there are only a few types of pigment that also have excellent light resistance, gas resistance, and so forth, and even if one of these few types is used in an attempt to raise saturation by an increase in pigment concentration as mentioned above, there is the danger that this will cause problems such as nozzle clogging in an inkjet printer or hue changes of the three primary colors, so this approach is not effective.

Japanese Laid-Open Patent Application 2000-351928 discloses a pigment ink set with a wide color reproduction range, in which a color printing-use color inkjet ink set comprises orange, green, and/or violet, each containing a specific pigment, in addition to the three YMC pigment inks (Patent Document 1). This ink set, though, had a saturation reproduction range that could not be considered adequate, and it was impossible to raise the saturation without leading to a decrease in glossiness. In particular, it was impossible to raise the vermilion saturation without leading to pronounced granularity when the image was expressed by dots (that is, the dots were visible to the naked eye as particles). WO99/05230 discloses an ink set comprising two special color pigment inks (orange and green) in addition to YMCK four-color pigment inks (Patent Document 2), but although this ink set does have excellent reproducibility of colors with low saturation and high brightness, such as pastel colors, its saturation reproduction range is just as inadequate as the above-mentioned ink sets when it comes to other colors, making it impossible to raise the saturation without leading to a decrease in glossiness.

Another problem with recorded matter formed using a conventional pigment ink set was that the hue of the recorded image changed with the illuminating light source, which is called metamerism. This metamerism was particularly pronounced in composite blacks and grays formed with a YMC three-color ink, and was a source of diminished image quality.

Various ink sets have been proposed in an effort to solve these problems encountered with conventional ink sets, such as an ink set comprising a specific special color pigment ink (red and/or violet) in addition to the three YMC pigment inks in order to provide printed matter with high saturation and gloss and without any particularly pronounced granularity, but the effect thereof has yet to reach a satisfactory level. The reason lies in the problem that the improvement varies with the type of recording medium to which the ink set is applied. For instance, when the ink set is applied at low resolution to a recording medium having a coating layer, such as photographic paper, the problem is that granularity becomes particularly pronounced because dot expression is employed in the recording. When the ink set is applied to plain paper (a recording medium in which fibers are exposed on the recording surface), the problem is that there is a particular decrease in coloration of dark areas (where the L* value defined in the CIE Lab color space on the recording medium is around 40).

Depending on the image being formed, its reflected light may not consistently be white, and instead may appear to reflect in another color, which diminishes the quality of the image. Consequently, there has been a need for the development of an ink set capable of reflecting white light from an image.

Patent Document 1: Japanese Laid-Open Patent Application 2000-351928
Patent Document 2: WO99/05230

It is therefore an object of the present invention to provide an ink set with which can be obtained a glossy recorded image that has a wide color reproduction range, has high saturation, and has no pronounced granularity caused by dot expression, and in particular with which can be obtained a recorded image that has greatly suppressed granularity caused by dot expression when applied to a medium having a coating layer, and that has outstanding coloration when applied to plain paper.

It is a further object of the present invention to provide the following ink sets (1) to (6) that add to the excellent performance described above.

(1) An ink set capable of giving a high-quality image with reduced metamerism and with white reflected light of the image.

(2) An ink set capable of giving a high-quality image with reduced metamerism and with excellent expression of high-saturation magenta color.

(3) An ink set capable of giving a high-quality image with reduced metamerism and with excellent coloration of dark areas of a specific hue angle on plain paper.

(4) An ink set capable of giving a high-quality image with reduced metamerism and with excellent expression of high-saturation orange-red color regions.

(5) An ink set capable of giving a high-quality image with good gas resistance and capable of expressing low-brightness and high-saturation orange and red at the same time.

(6) An ink set capable of giving a high-quality image with white reflected light of the image and suppressed fading.

It is another object of the present invention to provide an ink set of high reliability for use in inkjet recording.

It is yet another object of the present invention to provide a recording method and recording system with which can be obtained a glossy recorded image that has a wide color reproduction range, has high saturation, and has no pronounced granularity caused by dot expression, and in particular with which can be obtained a recorded image that has greatly suppressed granularity caused by dot expression when applied to a medium having a coating layer, and that has outstanding coloration when applied to plain paper.

It is still another object of the present invention to provide recorded matter having a glossy recorded image that has a wide color reproduction range, has high saturation, and has no pronounced granularity caused by dot expression, and in particular has greatly suppressed granularity caused by dot expression when applied to a medium having a coating layer, and has outstanding coloration when applied to plain paper.

SUMMARY

As a result of diligent research, the inventors learned that the stated object can be achieved by an ink set comprising three colors, namely, a yellow ink, magenta ink, and cyan ink, along with a red ink as a special color ink, wherein the L* value in the CIE-Lab system under specific conditions for each of the above inks is within a specific range.

The present invention was conceived on the basis of this finding, and provides an ink set comprising at least yellow ink (Y), magenta ink (M), cyan ink (C), and red ink (R), wherein the L* values in the Lab colorimetric system specified by CIE for aqueous solutions of each ink diluted 1000 times are within the following ranges.

(Y): at least 89 and no more than 94, (M): at least 76 and no more than 93, (C): at least 74 and no more than 87, (R): at least 55 and no more than 74

Because the ink set of the present invention is constituted as above, it is possible to obtain a glossy recorded image that has a wide color reproduction range, has high saturation, and has no pronounced granularity caused by dot expression, and in particular to obtain a recorded image that has greatly suppressed granularity caused by dot expression when applied to a medium having a coating layer, and that has outstanding coloration when applied to plain paper.

The present invention further provides an ink set wherein the yellow ink contains 2.0 to 4.0 wt % C.I. Pigment Yellow 74, the magenta ink contains 1.7 to 3.0 wt % C.I. Pigment Violet 19, the cyan ink contains 0.5 to 2.5 wt % C.I. Pigment Blue 15:3, and the red ink contains 2.2 to 2.8 C.I. Pigment Red 177. With this ink set, in addition to the excellent performance discussed above, in particular the reflected light from the image is white and a high-quality image with reduced metamerism can be obtained.

The present invention further provides an ink set wherein the yellow ink contains 2.0 to 4.0 wt % C.I. Pigment Yellow 74, the magenta ink contains 1.7 to 3.0 wt % C.I. Pigment Violet 19, the cyan ink contains 0.5 to 2.5 wt % C.I. Pigment Blue 15:3, and the red ink contains 1.6 to 2.3 C.I. Pigment Red 178. With this ink set, in addition to the excellent performance discussed above, in particular the expression of high-saturation magenta color is excellent and a high-quality image with reduced metamerism can be obtained.

The present invention further provides an ink set wherein the yellow ink contains 2.0 to 4.0 wt % C.I. Pigment Yellow 74, the magenta ink contains 1.7 to 3.0 wt % C.I. Pigment Violet 19, the cyan ink contains 0.5 to 2.5 wt % C.I. Pigment Blue 15:3, and the red ink contains 1.8 to 2.4 C.I. Pigment Red 264. With this ink set, in addition to the excellent performance discussed above, in particular the coloration of dark areas with a specific hue angle on plain paper is excellent and a high-quality image with reduced metamerism can be obtained.

The present invention further provides an ink set wherein the yellow ink contains 2.0 to 4.0 wt % C.I. Pigment Yellow 74, the magenta ink contains 1.7 to 3.0 wt % C.I. Pigment Violet 19, the cyan ink contains 0.5 to 2.5 wt % C.I. Pigment Blue. 15:3, and the red ink contains 4.0 to 6.0 wt % C.I. Pigment Red 254. With this ink set, in addition to the excellent performance discussed above, in particular the expression of high-saturation orange-red color is excellent and a high-quality image with reduced metamerism can be obtained.

The present invention further provides an ink set wherein the yellow ink contains 2.0 to 4.0 wt % C.I. Pigment Yellow 74, the magenta ink contains 1.1 to 1.7 wt % C.I. Pigment Red 202 or 122, the cyan ink contains 0.5 to 2.5 wt % C.I. Pigment Blue 15:3, and the red ink contains 4.0 to 6.0 wt % C.I. Pigment Red 254. With this ink set, in addition to the excellent performance discussed above, in particular low-brightness and high-saturation orange and red can be expressed at the same time, and a high-quality image with good gas resistance can be obtained.

The present invention further provides an ink set wherein the yellow ink contains 2.0 to 4.0 wt % C.I. Pigment Yellow 74, the magenta ink contains 0.1 to 1.5 wt % C.I. Pigment Red 202 or 122 and 0.1 to 1.5 wt % C.I. Pigment Red 209 or 207, the cyan ink contains 0.5 to 2.5 wt % C.I. Pigment Blue 15:3, and the red ink contains 2.2 to 2.8 C.I. Pigment Red 177. With this ink set, in addition to the excellent performance discussed above, in particular the reflected light from the image is white and a high-quality image with less fading can be obtained.

The present invention further provides a recording method for forming an image using the above-mentioned ink set. With this recording method, it is possible to obtain a glossy recorded image that has a wide color reproduction range, has high saturation, and has no pronounced granularity caused by dot expression, and in particular to obtain a recorded image that has greatly suppressed granularity caused by dot expression when applied to a medium having a coating layer, and that has outstanding coloration when applied to plain paper.

The present invention further provides a recording system for forming an image using the above-mentioned ink set. With this recording system, it is possible to obtain a glossy recorded image that has a wide color reproduction range, has high saturation, and has no pronounced granularity caused by dot expression, and in particular to obtain a recorded image that has greatly suppressed granularity caused by dot expression when applied to a medium having a coating layer, and that has outstanding coloration when applied to plain paper.

The present invention further provides recorded matter comprising an image formed using the above-mentioned ink set. This recorded matter comprises a glossy recorded image that has a wide color reproduction range, has high saturation, and has no pronounced granularity caused by dot expression, and in particular that has greatly suppressed granularity caused by dot expression when applied to a medium having a coating layer, and that has outstanding coloration when applied to plain paper.

DESCRIPTION OF DRAWINGS

FIG. 1 is a graph of the relation between hue angle and saturation in recorded matter obtained using the various ink sets of Example A and a reference example;

FIG. 2 is a graph of the relation between hue angle and saturation in recorded matter obtained using the various ink sets of Example A and a reference example;

FIG. 3 is a graph of the relation between hue angle and saturation in recorded matter obtained using the various ink sets of Example A and a reference example;

FIG. 4 is a graph of the relation between hue angle and saturation in recorded matter obtained using the various ink sets of Example A and a reference example;

FIG. 5 is a graph of the relation between hue angle and saturation in recorded matter obtained using the various ink sets of Example B and a reference example; and FIG. 6 is a graph of the relation between hue angle and saturation in recorded matter obtained using the various ink sets of Example B and a reference example.

DETAILED DESCRIPTION

Ink Set

First, the ink set of the present invention will be described through preferred embodiments.

Ink Set of Embodiment A

The ink set of the present invention provides, in one embodiment thereof, an ink set wherein the L* values in the Lab calorimetric system specified by CIE (Commission Internationale d'Eclairage; International Commission on Illumination) for aqueous solutions of each ink diluted 1000 times are within the ranges of yellow ink (Y): at least 89 and no more than 94, magenda ink (M): at least 76 and less than 83, cyan ink (C): at least 74 and no more than 87, red ink (R): at least 67.5 and less than 69 (hereinafter referred to as the ink set of Embodiment A).

In terms of enhancing the effect of the present invention, it is even better for the above-mentioned L* values to be within the following ranges.

(Y) L*: 89 to 93, preferably 90 to 93, even more preferably 90 to 92, and especially 91 to 92. (M) L*: 77 to 82, preferably 78 to 82, even more preferably 79 to 82, and especially 81 to 82. (C) L*: 75 to 86, preferably 76 to 85, even more preferably 77 to 83, and especially 79 to 81. (R) L*: 67.5 to 68.8, preferably 67.7 to 68.7, even more preferably 67.8 to 68.6, and especially 68 to 68.5.

The above-mentioned L* values can be obtained by using a U3300 made by Hitachi, for example, to measure at a view angle of 2 degrees and with a D65 light source (the same applies hereinafter for the other inks).

The a* and b* values in the Lab calorimetric system specified by CIE for an aqueous solution of each of the above-mentioned inks used in the ink set of this Embodiment A diluted 1000 times are preferably within the following ranges.

(Y): a*: −14 to −8, b*: 102 to 115
(M): a*: 31 to 51, b*: −17 to −10
(C): a*: −40 to −24, b*: −37 to −22
(R): a*: 42 to 59, b*: −5 to −0.5

Just as with the above-mentioned L* values, the above-mentioned a* and b* values can also be obtained, for example, by measuring with a U3300 made by Hitachi (the same applies hereinafter for the other inks).

From such standpoints as excellent image fastness of the recorded matter, the colorant (coloring agent) contained in the various inks that make up the ink set of Embodiment A is preferably a pigment. This pigment can be either an inorganic pigment or an organic pigment, which can be used singly or in mixtures of two or more types. Examples of the above-mentioned inorganic pigment include titanium oxide and iron oxide, as well as carbon black manufactured by a known method such as a contact, furnace, or thermal method. Examples of the above-mentioned organic pigment include azo pigments (including azo lake, insoluble azo pigment, condensed azo pigment, chelate azo pigment, and so forth), polycyclic pigments (such as phthalocyanine pigment, perylene pigment, perinone pigment, anthraquinone pigment, quinacridone pigment, dioxazine pigment, thioindigo pigment, isoindolinone pigment, and quinophthalone pigment), dye chelates (such as basic dye chelates and acid dye chelates), nitro pigments, nitroso pigments, and aniline black. More specifically, as described below, the preferred pigment will be dictated by the various colors of ink.

Favorable examples of the yellow ink used in this Embodiment A include those that contain C.I. Pigment Yellow 74 in an amount of 2.0 to 4.0 wt %, and particularly 2.5 to 3.5 wt %, and especially 2.7 to 3.3 wt %. However, the yellow ink is not limited to the above, and as long as it has the specified L* value, there are no particular restrictions on the type of colorant or the amount in which it is contained, but examples include C.I. Pigment Yellow 1, 2, 3, 12, 13, 14, 16, 17, 73, 74, 75, 83, 93, 95, 97, 98, 109, 110, 114, 128, 129, 138, 139, 147, 150, 151, 154, 155, 180, and 185, which can be used singly or in combinations of two or more types and in a suitable amount so that the ink will have an L* value within the specified range. The components other than the colorant in the yellow ink will be discussed below for all the various inks.

Favorable examples of the magenta ink used in this Embodiment A include those that contain C.I. Pigment Violet 19 in an amount of 1.7 to 3.0 wt %, and particularly 1.7 to 2.5 wt %, and especially 1.8 to 2.3 wt %. The use of this C.I. Pigment Violet 19 is particularly favorable because a high-quality image with reduced metamerism will be obtained. However, the magenta ink is not limited to the above, and as long as it has the specified L* value, there are no particular restrictions on the type of colorant or the amount in which it is contained, but examples include C.I. Pigment Red 5, 7, 12, 48 (Ca), 48 (Mn), 57 (Ca), 57:1, 112, 122, 123, 168, 184, 202, and 209, and C.I. Pigment Violet 19, which can be used singly or in combinations of two or more types and in a suitable amount so that the ink will have an L* value within the specified range. The components other than the colorant in the magenta ink will be discussed below for all the various inks.

If the magenta ink has a Y value of 55 in the CIE XYZ colorimetric system, which is calculated from the ultraviolet/visible transmissivity and absorptivity of an aqueous solution of the ink diluted 1000 times, then it is preferable to use an ink whose Z value is 83 or less because the metamerism will be extremely good even at low resolution, granularity can be better suppressed, and an image with better color reproducibility can be obtained.

Favorable examples of the cyan ink used in this Embodiment A include those that contain C.I. Pigment Blue 15:3 in an amount of 0.5 to 2.5 wt %, and particularly 1.0 to 2.0 wt %, and especially 1.2 to 1.8 wt %. However, the cyan ink is not limited to the above, and as long as it has the specified L* value, there are no particular restrictions on the type of colorant or the amount in which it is contained, but examples include C.I. Pigment Blue 1, 2, 3, 15:3, 15:4, 15:34, 16, 22, and 60, and C.I. Vat Blue 4 and 60, which can be used singly or in combinations of two or more types and in a suitable amount so that the ink will have an L* value within the specified range. The components other than the colorant in the cyan ink will be discussed below for all the various inks.

Favorable examples of the red ink used in this Embodiment A include those that contain C.I. Pigment Red 177 in an amount of 2.2 to 2.8 wt %, and particularly 2.3 to 2.8 wt %, and especially 2.4 to 2.7 wt %. The use of this C.I. Pigment Red 177 is particularly favorable because the reflected light from the image will can be made white. However, the red ink is not limited to the above, and as long as it has the specified L* value, there are no particular restrictions on the type of colorant or the amount in which it is contained, but examples include C.I. Pigment Orange 5, 43 and 62 and C.I. Pigment Red 17, 49:2, 112, 149, 177, 178, 188, 255, and 264, which can be used singly or in combinations of two or more types and in a suitable amount so that the ink will have an L* value within the specified range. The components other than the colorant in the red ink will be discussed below for all the various inks.

Because it contains this red ink, the ink set of this Embodiment A can reproduce lower-brightness and higher-saturation colors than when an image is formed by mixing two colors, namely, yellow ink and magenta ink, so an image with a wider color reproduction range can be obtained.

The ink set of this Embodiment A contains at least the various inks discussed above, namely, yellow, magenta, cyan, and red inks, but it is preferable for it to further contain a violet ink (Vi) whose L* value in the Lab colorimetric system specified by CIE for an aqueous solution diluted 1000 times is within a range of at least 40 and no more than 58, because lower-brightness and higher-saturation colors can be reproduced, and an image with a wider color reproduction range can be obtained, than when an image is formed by mixing two colors, namely, yellow ink and magenta ink.

The above-mentioned L* value pertaining to the violet ink is preferably from 42 to 55, and even more preferably 45 to 52, because the above-mentioned effect will be even better.

The a* and b* values Lab colorimetric system specified by CIE for an aqueous solution of violet ink diluted 1000 times are preferably within the following ranges.

(Vi): a*: 56 to 76, b*: −75 to −56

Favorable examples of violet ink include those that contain C.I. Pigment Violet 23 in an amount of 1.0 to 3.0 wt %, and particularly 1.5 to 2.5 wt %, and especially 1.7 to 2.3 wt %. However, the violet ink is not limited to the above, and as long as it has the specified L* value, there are no particular restrictions on the type of colorant or the amount in which it is contained, but examples include C.I. Pigment Blue 60 and C.I. Pigment Violet 3, 19, 23, 32, 36, and 38, which can be used singly or in combinations of two or more types and in a suitable amount so that the ink will have an L* value within the specified range. The components other than the colorant in the violet ink will be discussed below for all the various inks.

The ink set of this Embodiment A contains at least the various inks discussed above, namely, yellow, magenta, cyan, and red inks, and also a violet ink if needed, but it can also contain a black ink.

Examples of colorants that can be used as this black ink include those that contain carbon blacks (C.I. Pigment Black 7) such as furnace black, lamp black, acetylene black, or channel black, iron oxide pigments, and other such inorganic pigments, or aniline black (C.I. Pigment Black 1) and other such organic pigments. Of these pigments, the use of a carbon black is particularly favorable. Examples of favorable carbon blacks include No. 2300, No. 900, MCF 88, No. 33, No. 40, No. 52, MA 7, MA 8, MA 100, and No. 2200 B made by Mitsubishi Chemical; Raven 5750, Raven 5250, Raven 5000, Raven 3500, Raven 1255, and Raven 700 made by Columbian Carbon; Regal 400 R, Regal 1660 R, Mogul 1, Monarch 700, Monarch 800, Monarch 880, Monarch 900, Monarch 1000, Monarch 1100, Monarch 1300, and Monarch 1400 made by Cabot; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 made by Degussa.

In this Embodiment A, it is particularly favorable for the black ink to contain a carbon black in an amount of 3.0 wt % or less (hereinafter also referred to as photoblack ink (PK)), because this will afford especially good gloss of mixed colors and suppression of granularity of the image when applied to a medium having a coating layer as the recording medium. Also, a black ink that contains more than 3.0 wt % carbon block is favorable (hereinafter also referred to as matte black ink (MK)) because this will result in particularly good coloration of the image when applied to plain paper as the recording medium.

Just one of these black inks can be used, or both can be used, but using both a photoblack ink and a matte black ink is preferable in terms of obtaining the functions of both inks.

The amount in which the carbon black is contained in the photoblack ink is preferably 0.1 to 3.0 wt %, and even more preferably 1.0 to 2.0 wt %, and especially 1.2 to 1.8 wt %. A photoblack ink that contains C.I. Pigment Blue 15:3 or another such cyan pigment in an tiny amount of no more than 1.0 wt %, and particularly 0.25 wt % or less, as a complementary color pigment in addition to carbon black is preferable in that it affords a complementary color effect in the recorded image.

The photoblack ink preferably has an L* value of 42 to 67, and even more preferably 48 to 60, in the Lab colorimetric system specified by CIE for an aqueous solution diluted 1000 times, preferably has an a* value of from −2.75 to −2.40, and preferably has a b* value of from 9 to 14.

Meanwhile, the amount in which the carbon black is contained in the matte black ink is preferably 4.0 to 9.0 wt %, and even more preferably 5.0 to 8.0 wt %, and especially 6.0 to 7.0 wt %.

The matte black ink preferably has an L* value of 0.1 to 16, and even more preferably 2 to 10, in the Lab colorimetric system specified by CIE for an aqueous solution diluted 1000 times, preferably has an a* value of from 1 to 8, and preferably has a b* value of from 1 to 18.

In addition to the above-mentioned inks, the ink set of this Embodiment A may also contain one or more other inks, such as a concentrated magenta ink with a higher colorant concentration than the above-mentioned magenta ink, or a concentrated cyan ink with a higher colorant concentration than the above-mentioned cyan ink.

In addition to containing pigments as colorants, the various inks that make up the ink set of this Embodiment A preferably also contain a dispersant for dispersing these pigments. There are no particular restrictions on the dispersant, which can be the same as those used in other pigment inks of this type, but examples include cationic dispersants, anionic dispersants, nonionic dispersants, and surfactants. Examples of anionic dispersants include polyacrylic acid, polymethacrylic acid, acrylic acid/acrylonitrile copolymer, vinyl acetate/acrylic ester copolymer, acrylic acid/acrylic alkyl ester copolymer, styrene/acrylic acid copolymer, styrene/methacrylic acid copolymer, styrene/acrylic acid/acrylic alkyl ester copolymer, styrene/methacrylic acid/acrylic alkyl ester copolymer, styrene/a-methylstyrene/acrylic acid copolymer, styrene/α-methylstyrene/acrylic acid/acrylic alkyl ester copolymer, styrene/maleic acid copolymer, vinyinaphthalene/maleic acid copolymer, vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer. Examples of anionic surfactants include sodium dodecylbenzenesulfonate, sodium laurylate, and ammonium salt of polyoxyethylene alkyl ether sulfate. Examples of nonionic surfactants include polyoxyethylene alkyl ether, polyoxyethylene alkyl ester, polyoxyethylene sorbitan fatty acid ester, polyoxyethylene alkylphenyl ether, polyoxyethylenealkylamine, and polyoxyethylenealkylamide. These can be used singly or in combinations of two or more types. From the standpoint of raising the dispersion stability of the pigment, it is preferable to use a styrene-(meth)acrylic acid copolymer.

The above-mentioned dispersant is usually contained in each of the inks in an amount, calculated as solids, of no more than 140 wt % with respect to the weight of the pigment.

In particular, with color inks such as yellow ink, magenta ink, cyan ink, red ink, and violet ink, the above-mentioned dispersant is preferably contained in an amount, calculated as solids, of 20 to 80 wt %, and ideally 40 wt %, with respect to the weight of the pigment.

Meanwhile, the black ink may or may not contain the above-mentioned dispersant in the matte black ink, and in terms of enhancing the coloration of the recorded image, it is particularly favorable not to use this dispersant (0 wt %) and to use instead a self-dispersing pigment as the colorant. A self-dispersing pigment is a pigment that has been treated so as to have one or more functional groups (dispersibility imparting groups) selected from the group consisting of —COOH, —CHO, —OH, —SO₃H, and salts of these, on the surface of the present invention. This allows for uniform dispersion in a water-based ink without having to add a dispersant separately. The term "dispersion" as used here refers to a state in which a self-dispersing pigment is stable in water without any dispersant, and encompasses not only a state of being dispersed, but also a state of being dissolved.

Also, with a photoblack ink, it is preferable in terms of increasing the gloss of the recorded image for the above-mentioned dispersant to be contained in an amount (calculated as solids) of 60 to 120 wt %, and ideally 100 wt %.

The amount (calculated as solids) of dispersant with respect to the amount of each ink is preferably 0.1 to 10 wt %, and even more preferably 0.3 to 6 wt %.

From the standpoint of preventing the clogging of the head in an inkjet printer by preventing the ink from drying out when used in inkjet recording, it is preferable for each of the inks that make up the ink set of this Embodiment A to contain a high-boiling organic solvent. Examples of high-boiling organic solvents include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerol, trimethylolethane, and trimethylolpropane; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone and N-methyl-2-pyrrolidone; 1,3-di-methyl-2-imidazolidinone; and organic alkalies such as triethanolamine; and sugars such as sugar alcohols. These can be used singly or in combinations of two or more types. The addition of triethanolamine or another such organic alkali is preferable because it stabilizes the dispersibility of the colorant and enhances the gloss of the recorded image.

The above-mentioned high-boiling organic solvent is preferably contained in each of the inks in an amount of 0.1 to 30 wt %, and even more preferably 0.5 to 20 wt %.

Each of the inks that make up the ink set of this Embodiment A can also contain a penetration promoter in order to improve the penetration of the ink by increasing the wettability of the recording medium. Examples of the penetration promoter include alcohols such as methanol, ethanol, and iso-propyl alcohol, lower alkyl ethers of polyhydric alcohols such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether, and diols such as 1,2-pentane diol and 1,2-hexane diol. These can be used singly or in combinations of two or more types. The use of diethylene glycol monobutyl ether, triethylene glycol monobutyl ether, or 1,2-hexanediol is particularly favorable.

The penetration promoter is preferably contained in the ink in an amount of 1 to 20 wt %, and even more preferably 1 to 10 wt %.

Just as with the above-mentioned penetration promoter, from the standpoint of preventing the clogging of the head in an inkjet printer by preventing the ink from drying out when used in inkjet recording, it is preferable for each of the inks that make up the ink set of this Embodiment A to contain any of various types of surfactant, such as anionic surfactants, nonionic surfactants, cationic surfactants, and amphoteric surfactants, and the use of an acetylene glycol compound or a silicone compound is particularly favorable. This acetylene glycol compound can be a commercially available product, such as Olfine Y, Surfynol 82, Surfynol 440, Surfynol 465, Surfynol 485, Olfine STG, or Olfine E1010 (all of which are made by Air Products and Chemicals). These can be used singly or in combinations of two or more types. The use of Surfynol 465 is particularly favorable. The silicone compound can also be a commercially available product, such BYK348 (made by BYK-Chemie Japan) or another such polysiloxane compound. The acetylene glycol compound and/or silicone compound is preferably contained in the ink in an amount of 0.01 to 5 wt %, and even more preferably 0.1 to 0.5 wt %.

From the standpoint of shortening the ink drying time, each of the inks that make up the ink set in this Embodiment A can also contain a low-boiling organic solvent. Examples of this low-boiling organic solvent include methanol, ethanol, n-propyl alcohol, iso-propyl alcohol, n-butanol, sec-butanol, tert-butanol, iso-butanol, and n-pentanol. These can be used singly or in combinations of two or more types. Monohydric alcohols are particularly favorable.

Each of the inks that make up the ink set in this Embodiment A contains the above-mentioned pigment, dispersant, high-boiling organic solvent, penetration promoter, acetylene glycol compound and/or silicone compound, and other such components, with the balance usually consisting of water. It is preferable for the water to be deionized water, ultrafiltrated water, reverse osmosis water, distilled water, or other such pure or ultrapure water. It is particularly favorable for the water to be sterilized by the addition of hydrogen peroxide or by UV irradiation, for example, because this prevents the growth of mold or bacteria in the water for an extended period.

In addition, each of the inks that make up the ink set in this Embodiment A can contain as needed a fixing agent such as a water-soluble rosin; a mildewcide/preservative such sodium benzoate; an antioxidant/UV absorbent such as an allophanate; a chelating agent; an oxygen absorbent; a pH regulator, or other such additives, which can be used singly or in combinations of two or more types.

The inks that make up the ink set in this Embodiment A can be prepared the same way as conventional pigment inks, using a ball mill, a sand mill, an attritor, a basket mill, a roll mill, or the like. During this preparation it is preferable to remove any coarse particles with a membrane filter, mesh filter, or the like.

When the ink set of this Embodiment A is applied to a medium having a coating layer as the recording medium for forming an image (i.e., when an image is to be formed thereon), it is preferable for the L* values of each ink at a 20% duty (the L* values defined in the CIE Lab color space) on the medium to be within the following ranges.

(Y): 85 to 95, (M) 70 to 80, (C): 70 to 80, (R): 62 to 72

This L* value at a 20% duty can be measured with a D50 light source and at a view angle of 2 degrees using an SPM-50 made by Gretag (the same applies hereinafter).

In this Specification, the phrase "medium having a coating layer" refers to all those in which the side on which an image is formed (recording side) using the above-mentioned ink set is covered at least with a coating layer. This medium having a coating layer is usually one with an 85-degree gloss of 120 or less. This 85-degree gloss is measured using a PG1M (made by Nippon Denshoku Industries) or the like. For this measurement, the measurement apparatus is first adjusted so that the 85-degree gloss of a standard gloss board is 100.

An example of the medium having a coating layer is a mirror-finished medium whose 85-degree gloss is 70 to 120, such as a medium having a resin coating layer such that when illuminated by a florescent lamp from a distance of at least 1 m, the outline of the image of the florescent lamp can be recognized visually. A typical example of this is PGPP (Premium Glossy Photo Paper) made by Seiko Epson, which has an 85-degree gloss of 81.

Other examples of the medium having a coating layer are a semi-glossy medium whose 85-degree gloss is 10 to 70, and a matte medium whose 85-degree gloss is less than 10.

In this Specification, "duty" is defined by the following equation, and indicates the units of the calculated value D.

$$D = (\text{number of printed dots}/(\text{vertical resolution} \times \text{horizontal resolution})) \times 100$$

A duty of 100% refers to the maximum weight of a monochromatic ink with respect to a pixel.

With the ink set of this Embodiment A, it is preferable for magenta ink and red ink to be combined so that the L* value of magenta ink at a duty of 20% on the medium having a coating layer will be from 1.0 to 1.2 times the L* value of red ink at a duty of 20% on the medium having a coating layer.

Also, with the ink set of this Embodiment A, it is preferable for cyan ink and red ink to be combined so that the L* value of cyan ink at a duty of 20% on the medium having a coating layer will be from 1.0 to 1.2 times the L* value of red ink at a duty of 20% on the medium having a coating layer.

If the ink set of this Embodiment A comprises a violet ink, it is preferable for the L* value of this ink at a duty of 20% on the medium having a coating layer to be within a range of (Vi) 47 to 57.

In this case, it is preferable for magenta ink and violet ink to be combined so that the L* value of magenta ink at a duty of 20% on the medium having a coating layer will be from 1.4 to 1.6 times the L* value of violet ink at a duty of 20% on the medium having a coating layer.

Also, in this same case, it is preferable for cyan ink and violet ink to be combined so that the L* value of cyan ink at a duty of 20% on the medium having a coating layer will be from 1.4 to 1.6 times the L* value of violet ink at a duty of 20% on the medium having a coating layer.

There are no particular restrictions on the applications in which the ink set of this Embodiment A is used, but this ink set can be favorably used in inkjet recording, which is a recording method in which an image such as text or graphics is formed by discharging droplets of ink from a nozzle and causing the droplets to adhere to a recording medium. It is particularly favorable to use this ink set in an on-demand type of inkjet recording method. Examples of on-demand inkjet recording methods include piezoelectric recording in which recording is performed using piezoelectric elements installed in the printer head, and hot jet recording in which recording is performed using thermal energy produced by a heater of exothermic resistor elements or the like installed in the printer head, but this ink set can be used to advantage in any type of inkjet recording method.

When the ink set of this Embodiment A is used in an inkjet recording method as discussed above, it will afford high reliability as an ink set for inkjet recording, and particularly if the inks in the ink set each have a pigment concentration such that no nozzle clogging or the like will occur in the inkjet printer, then the reliability as an inkjet recording ink set will be even higher, despite the wide range of color reproducibility.

Ink Set of Embodiment B

The ink set of the present invention provides, in another embodiment thereof, an ink set wherein the L* values in the Lab calorimetric system specified by CIE for aqueous solutions of each ink diluted 1000 times are within the ranges of yellow ink (Y): at least 89 and no more than 94, magenta ink (M): at least 76 and less than 83, cyan ink (C): at least 74 and no more than 87, red ink (R): at least 69 and no more than 74 (hereinafter referred to as the ink set of Embodiment B).

In terms of enhancing the effect of the present invention, it is even better for the above-mentioned L* values to be within the following ranges.

(Y) L*: 89 to 93, preferably 90 to 93, even more preferably 90 to 92, and especially 91 to 92. (M) L*: 77 to 82, preferably 78 to 82, even more preferably 79 to 82, and especially 81 to 82. (C) L*: 75 to 86, preferably 76 to 85, even more preferably 77 to 83, and especially 79 to 81. (R) L*: 69 to 73, preferably 69 to 72, even more preferably 70 to 72, and especially 70 to 71.

Those points not covered in detail in this Embodiment B are the same as described for Embodiment A above. Therefore, other than the portions different from Embodiment A, everything described in Embodiment A above can be correspondingly applied to the ink set of this Embodiment B.

The a* and b* values in the Lab calorimetric system specified by CIE for an aqueous solution of the above-mentioned red ink (R) used in the ink set of this Embodiment B diluted 1000 times are preferably within the following ranges.

(R): a*: 37 to 57, b*: 2 to 11

The red ink used in this Embodiment B preferably contains, for example, C.I. Pigment Red 178 in an amount of 1.6 to 2.3 wt %, and even more preferably 1.7 to 2.2 wt %, and especially 1.8 to 2.1 wt %. It is particularly favorable to use an ink containing this C.I. Pigment Red 178 because, in combination with an ink containing the above-mentioned C.I. Pigment Violet 19, for example, a magenta color of higher saturation can be achieved.

Because the ink set of this Embodiment B contains this red ink, it can reproduce colors of lower brightness and higher saturation than when an image is formed by mixing a yellow ink and a magenta ink, so images can be obtained over a wider range of color reproduction.

Ink Set of Embodiment C

In another embodiment, the present invention provides an ink set wherein the L* values in the Lab colorimetric system specified by CIE for aqueous solutions of each ink diluted 1000 times are within the ranges of yellow ink (Y): at least 89 and no more than 94, magenta ink (M): at least 76 and less than 83, cyan ink (C): at least 74 and no more than 87, red ink (R): at least 62 and less than 67.5 (hereinafter referred to as the ink set of Embodiment C).

In terms of enhancing the effect of the present invention, it is even better for the above-mentioned L* values to be within the following ranges.

(Y) L*: 89 to 93, preferably 90 to 93, even more preferably 90 to 92, and especially 91 to 92. (M) L*: 77 to 82, preferably 78 to 82, even more preferably 79 to 82, and especially 81 to 82. (C) L*: 75 to 86, preferably 76 to 85, even more preferably 77 to 83, and especially 79 to 81. (R) L*: 63 to 67, preferably 64 to 67, even more preferably 65 to 67, and especially 66 to 67.

Those points not covered in detail in this Embodiment C are the same as described for Embodiment A above. Therefore, other than the portions different from Embodiment A, everything described in Embodiment A above can be correspondingly applied to the ink set of this Embodiment C.

The a* and b* values in the Lab colorimetric system specified by CIE for an aqueous solution of the above-mentioned red ink (R) used in the ink set of this Embodiment C diluted 1000 times are preferably within the following ranges.

(R): a*: 42 to 62, b*: 1 to 10

The red ink used in this Embodiment C preferably contains, for example, C.I. Pigment Red 264 in an amount of 1.8 to 2.4 wt %, and even more preferably 1.8 to 2.2 wt %, and especially 1.9 to 2.1 wt %. It is particularly favorable to use an ink containing this C.I. Pigment Red 264 because a recorded image can be obtained with excellent coloration of dark areas with a hue angle of 20 to 30 degrees.

Because the ink set of this Embodiment C contains this red ink, it can reproduce colors of lower brightness and higher saturation than when an image is formed by mixing a yellow ink and a magenta ink, so images can be obtained over a wider range of color reproduction.

Ink Set of Embodiment D

In another embodiment, the present invention provides an ink set wherein the L* values in the Lab calorimetric system specified by CIE for aqueous solutions of each ink diluted 1000 times are within the ranges of (Y): at least 89 and no more than 94, (M): at least 76 and less than 83, (C): at least 74 and no more than 87, (R): at least 55 and less than 62 (hereinafter referred to as the ink set of Embodiment D).

In terms of enhancing the effect of the present invention, it is even better for the above-mentioned L* values to be within the following ranges.

(Y) L*: 89 to 93, preferably 90 to 93, even more preferably 90 to 92, and especially 91 to 92. (M) L*: 77 to 82, preferably 78 to 82, even more preferably 79 to 82, and especially 81 to 82. (C) L*: 75 to 86, preferably 76 to 85, even more preferably 77 to 83, and especially 79 to 81. (R) L*: 55 to 60, preferably 55 to 60, even more preferably 56 to 59, and especially 57 to 58.

Those points not covered in detail in this Embodiment D are the same as described for Embodiment A above. Therefore, other than the portions different from Embodiment A, everything described in Embodiment A above can be correspondingly applied to the ink set of this Embodiment D.

The a* and b* values in the Lab colorimetric system specified by CIE for an aqueous solution of the above-mentioned red ink (R) used in the ink set of this Embodiment D diluted 1000 times are preferably within the following ranges.

(R): a*: 74 to 79, b*: 36 to 48

The red ink used in this Embodiment D preferably contains, for example, C.I. Pigment Red 254 in an amount of 4.0 to 6.0 wt %, and even more preferably 4.5 to 5.5 wt %, and especially 4.7 to 5.3 wt %. It is particularly favorable to use an ink containing this C.I. Pigment Red 254 because the coloration of orange-red color regions of high saturation can be achieved.

Because the ink set of this Embodiment D contains this red ink, it can reproduce colors of lower brightness and higher saturation than when an image is formed by mixing a yellow ink and a magenta ink, so images can be obtained over a wider range of color reproduction.

Ink Set of Embodiment E

In another embodiment, the present invention provides an ink set wherein the L* values in the Lab colorimetric system specified by CIE for aqueous solutions of each ink diluted 1000 times are within the ranges of yellow ink (Y): at least 89 and no more than 94, magenta ink (M): at least 83 and less than 87, cyan ink (C): at least 74 and no more than 87, red ink (R): at least 55 and less than 62 (hereinafter referred to as the ink set of Embodiment E).

In terms of enhancing the effect of the present invention, it is even better for the above-mentioned L* values to be within the following ranges.

(Y) L*: 89 to 93, preferably 90 to 93, even more preferably 90 to 92, and especially 91 to 92. (M) L*: 83 to 86.5, preferably 83 to 86, even more preferably 84 to 86, and especially 84 to 85. (C) L*: 75 to 86, preferably 76 to 85, even more preferably 77 to 83, and especially 79 to 81. (R) L*: 55 to 61, preferably 55 to 60, even more preferably 56 to 59, and especially 57 to 58.

Those points not covered in detail in this Embodiment E are the same as described for Embodiment A above. Therefore, other than the portions different from Embodiment A, everything described in Embodiment A above can be correspondingly applied to the ink set of this Embodiment E.

The a* and b* values in the Lab colorimetric system specified by CIE for aqueous solutions of the above-mentioned magenta ink (M) and red ink (R) used in the ink set of this Embodiment E diluted 1000 times are preferably within the following ranges.

(M): a*: 17 to 36, b*: −22 to −11
(R): a*: 74 to 79, b*: 36 to 48

The magenta ink used in this Embodiment E preferably contains, for example, C.I. Pigment Red 202 or 122 in an amount of 1.1 to 1.7 wt %, and even more preferably 1.2 to 1.7 wt %, and especially 1.4 to 1.6 wt %. It is particularly favorable to use an ink containing this C.I. Pigment Red 202 because, in combination with the other inks pertaining to the present invention, the metamerism of the recorded image can be suppressed and the gas resistance increased.

The red ink used in this Embodiment E preferably contains, for example, C.I. Pigment Red 254 in an amount of 4.0 to 6.0 wt %, and even more preferably 4.5 to 5.5 wt %, and especially 4.7 to 5.3 wt %. It is particularly favorable to use an ink containing this C.I. Pigment Red 254 because the coloration of orange-red color regions of high saturation can be achieved.

Because the ink set of this Embodiment E contains this red ink, it can reproduce colors of lower brightness and higher saturation than when an image is formed by mixing a yellow ink and a magenta ink, so images can be obtained over a wider range of color reproduction.

Ink Set of Embodiment F

In another embodiment, the present invention provides an ink set wherein the L* values in the Lab colorimetric system specified by CIE for aqueous solutions of each ink diluted 1000 times are within the ranges of (Y): at least 89 and no more than 94, (M): at least 87 and no more than 93, (C): at least 74 and no more than 87, (R): at least 67.5 and less than 69 (hereinafter referred to as the ink set of Embodiment F).

In terms of enhancing the effect of the present invention, it is even better for the above-mentioned L* values to be within the following ranges.

(Y) L*: 89 to 93, preferably 90 to 93, even more preferably 90 to 92, and especially 91 to 92. (M) L*: 87 to 92, preferably 87 to 91, even more preferably 88 to 90, and especially 88 to 89. (C) L*: 75 to 86, preferably 76 to 85, even more preferably 77 to 83, and especially 79 to 81. (R) L*: 67.5 to 68.8, preferably 67.7 to 68.7, even more preferably 67.8 to 68.6, and especially 68 to 68.5.

Those points not covered in detail in this Embodiment F are the same as described for Embodiment A above. Therefore, other than the portions different from Embodiment A, everything described in Embodiment A above can be correspondingly applied to the ink set of this Embodiment F.

The a* and b* values in the Lab colorimetric system specified by CIE for aqueous solutions of the above-mentioned magenta ink (M) used in the ink set of this Embodiment F diluted 1000 times are preferably within the following ranges.

(M): a*: 15 to 26, b*: −13 to −7

The magenta ink used in this Embodiment F preferably contains, for example, both C.I. Pigment Red 202 or 122 in an amount of 0.1 to 1.5 wt %, and even more preferably 0.25 to 1.25 wt %, and especially 0.5 to 1.2 wt %, and C.I. Pigment Red 209 or 207 in an amount of 0.1 to 1.5 wt %, and even more preferably 0.25 to 1.25 wt %, and especially 0.5 to 1.2 wt %, because this will yield an image of high quality with reduced metamerism.

Recording Method

The recording method of the present invention will now be described.

The present invention is a recording method for forming an image by using the above-mentioned ink set, and more specifically, a method for forming an image by using an ink set comprising at least yellow ink (Y), magenta ink (M), cyan ink (C), and red ink (R), each having a specific L* value as discussed above, and a recording method that makes use of one of the ink sets from the embodiments given above is particularly favorable. Other than the use of the above-mentioned ink set, the recording method of the present invention is the same as an ordinary inkjet recording method or the like.

The present invention in particular provides a favorable inkjet recording method with which, when droplets of a plurality of colors of the above-mentioned ink are discharged to form one color (monochromatic) out of YMC on a recording medium, the image is formed by ink corresponding to that color, and when a mixed color portion of secondary or higher color (a color that cannot be formed by a YMC ink alone), this mixed color portion is formed by at least two types of R ink out of YMC ink, or by at least two types of R ink out of YMC ink and a violet ink (Vi) having the specific L* value discussed above, or these inks plus a photoblack ink (PK) or matte black ink (MK).

Also, with the recording method of the present invention, when a mixed color portion of secondary or higher color is formed, it is preferable to use inks in the following combinations according to the sensory color indices a* and b* defined in the CIE Lab color space, on the medium on which the recorded image is to be formed, because this will yield a high-quality image with reduced metamerism.

Specifically, when forming a mixed color portion in which the above-mentioned sensory color indices a* and b* are within the ranges of a*=approximately −50 to approximately 50 and b*=approximately −50 to approximately 50, that is, a mixed color portion of one color from the hue group between white and black (such as gray), at least inks of the three colors of yellow, magenta, and cyan are used along with a red ink and/or a violet ink. Other inks besides these may also be used as needed, such as a photoblack ink or a matte black ink.

When forming a mixed color portion of one color from the hue group between white and black, the amount of ink applied per unit of surface area of the red ink and/or violet ink is preferably 10 to 90 wt %, and even more preferably 30 to 50 wt %, with respect to the total amount of ink applied in the formation of this mixed color portion.

When forming a mixed color portion in which the above-mentioned sensory color indices a* and b* are within the ranges of a*=approximately −40 to approximately 90 and b*=approximately −40 to approximately 100, that is, a mixed color portion of one color from the hue group between yellow and magenta (such as orange or red), at least inks of the two colors of yellow and magenta are used along with a red ink. In this case, the amount of ink applied per unit of surface area of the red ink is preferably 10 to 90 wt %, and even more preferably 30 to 50 wt %, with respect to the total amount of ink applied in the formation of this mixed color portion.

When forming a mixed color portion in which the above-mentioned sensory color indices a* and b* are within the ranges of a*=approximately −50 to approximately 100 and b*=approximately −10 to approximately −80, that is, a mixed color portion of one color from the hue group between magenta and cyan (such as violet or blue), at least inks of the two colors of magenta and cyan are used along with a red ink. In this case, the amount of ink applied per unit of surface area of the violet ink is preferably 10 to 90 wt %, and even more preferably 30 to 50 wt %, with respect to the total amount of ink applied in the formation of this mixed color portion.

With the recording method of the present invention, when forming a monochromatic image, it is preferable in terms of obtaining particularly good color reproducibility to using yellow ink, magenta ink, and red ink individually, and when forming a mixed color portion of secondary or higher color, to use a mixture of yellow ink, magenta ink, red ink, and matte black ink.

The maximum duty of an ink used alone here can be suitably selected according to the type of recording medium being used, but 60 to 120% is preferable, and the maximum amount of ink is preferably from 7 to 16 mg/inch$^2$. The maximum duty of ink used as a mixture is preferably from 80 to 130%, and the maximum amount of ink is preferably from 9 to 18 mg/inch$^2$.

With the recording method of the present invention, when forming a monochromatic image, it is preferable to use magenta ink, cyan ink, or violet ink alone, and when forming a mixed color portion of secondary or higher color, it is preferable to use a mixture of magenta ink, cyan ink, and violet ink, because this will result in particularly good suppression of metamerism.

Here again, the maximum duty of an ink used alone can be suitably selected according to the type of recording medium being used, but 60 to 120% is preferable, and the maximum amount of ink is preferably from 7 to 16 mg/inch$^2$. The maximum duty of ink used as a mixture is preferably from 80 to 130%, and the maximum amount of ink is preferably from 9 to 18 mg/inch$^2$.

The recording method of the present invention can be applied with no restrictions to any recording medium ordinarily used in inkjet recording methods and so forth, but as described below, is particularly useful when applied to a medium having a coating layer or to plain paper (a recording medium in which fibers are exposed on the recording side).

Specifically, when the recording method of the present invention is applied to a medium having a coating layer, it is possible to obtain a high-quality image that has greatly suppressed granularity caused by dot expression in the formation of the image.

When the recording method of the present invention is applied to a medium having a coating layer, it is preferably performed so that the L* value of each ink in the above-mentioned ink set at a duty of 20% on this medium will fall within the following ranges.

(Y): 85 to 95, (M) 70 to 80, (C): 70 to 80, (R): 62 to 72

Also, when the recording method of the present invention is applied to a medium having a coating layer, it is preferably performed so that the L* value of the magenta ink at a duty of 20% on a medium having a coating layer is 1.0 to 1.2 times the L* value of red ink at a duty of 20% on the medium having a coating layer.

Also, when the recording method of the present invention is applied to a medium having a coating layer, it is preferably performed so that the L* value of cyan ink at a duty of 20% on the medium having a coating layer will be from 1.0 to 1.2 times the L* value of red ink at a duty of 20% on the medium having a coating layer.

Furthermore, when the recording method of the present invention is applied to a medium having a coating layer, it is preferably performed so that a violet ink is also used, and the L* value of this ink at a duty of 20% on the medium having a coating layer is within a range of (Vi) 47 to 57.

In this same case, when a violet ink is used, it is preferable for the recording method to be performed so that the L* value of magenta ink at a duty of 20% on the medium having a coating layer is from 1.4 to 1.6 times the L* value of violet ink at a duty of 20% on the medium having a coating layer.

In this same case, when a violet ink is used, it is preferable for the recording method to be performed so that the L* value of cyan ink at a duty of 20% on the medium having a coating layer is from 1.4 to 1.6 times the L* value of violet ink at a duty of 20% on the medium having a coating layer.

Meanwhile, when the recording method of the present invention is applied to plain paper (a recording medium in which fibers are exposed on the recording surface), only a relatively small amount of ink need be applied in the formation of the image of a mixed color portion, and an image of high coloration can be formed, so distortion such as paper wrinkles, and the coloring of the back of the paper can be suppressed. Also, with the recording method of the present invention in which the above-mentioned ink set is used, a recorded image with outstanding coloration is obtained on plain paper, and in particular it is possible to obtain high saturation and low brightness (dark portions) that could not be obtained in the past.

Favorable examples of plain paper include Xerox P and Xerox 4024 (both of which are trademarks of Xerox), and wood-free plain paper (made by Seiko Epson).

With the recording method of the present invention, an image is preferably formed such that the amount of ink at a duty of 100% is from 7 to 13 mg/inch$^2$, and particularly from 7 to 10 mg/inch$^2$.

Recording System

The present invention is also a recording method for forming an image using the above-mentioned ink set, and a recording apparatus such as an inkjet printer that uses the ink sets in the embodiments described above, or another such recording system is particularly favorable.

Recorded Matter

The present invention is also recorded matter comprising an image formed using the above-mentioned ink set, and recorded matter produced using the ink sets in the embodiments described above is particularly favorable.

Modifications

The present invention favorably provides the various embodiments described above, but is not limited to or by these embodiments, and various modifications will be possible without departing from the scope thereof.

EXAMPLES

The present invention will now be described in more specific terms by giving examples and test examples of the present invention, but the present invention is not limited in any way by these examples.

Ink Set of Example A

Yellow ink, magenta ink, cyan ink, red ink, violet ink, photoblack ink, and matte black ink of the following compositions were each prepared by a standard process. Specifically, the colorant component was dispersed along with a dispersant component, after which other components were added and mixed, and any insolubles over a specific size were filtered off to prepare an ink. The various inks thus obtained were combined to produce the ink set of Example A.

| Yellow Ink | |
|---|---|
| C.I. Pigment Yellow 74 | 3.0 wt % |
| dispersant (styrene-acrylic acid copolymer) | 1.2 wt % |
| glycerol | 15.0 wt % |
| 1,2-hexanediol | 10.0 wt % |
| triethanolamine | 0.9 wt % |
| BYK348 (silicone-based surfactant) | 0.3 wt % |
| deionized water | balance |
| total | 100.0 wt % |

| Magenta Ink | |
|---|---|
| C.I. Pigment Violet 19 | 2.0 wt % |
| dispersant (styrene-acrylic acid copolymer) | 0.8 wt % |
| glycerol | 15.0 wt % |
| 1,2-hexanediol | 10.0 wt % |
| triethanolamine | 0.9 wt % |
| BYK348 (silicone-based surfactant) | 0.3 wt % |
| deionized water | balance |
| total | 100.0 wt % |

-continued

| Cyan Ink | |
|---|---|
| C.I. Pigment Blue 15:3 | 1.5 wt % |
| dispersant (styrene-acrylic acid copolymer) | 0.6 wt % |
| glycerol | 15.0 wt % |
| 1,2-hexanediol | 10.0 wt % |
| triethanolamine | 0.9 wt % |
| BYK348 (silicone-based surfactant) | 0.3 wt % |
| deionized water | balance |
| total | 100.0 wt % |

| Red Ink | |
|---|---|
| C.I. Pigment Red 177 | 2.5 wt % |
| dispersant (styrene-acrylic acid copolymer) | 1.0 wt % |
| glycerol | 15.0 wt % |
| 1,2-hexanediol | 10.0 wt % |
| triethanolamine | 0.9 wt % |
| BYK348 (silicone-based surfactant) | 0.3 wt % |
| deionized water | balance |
| total | 100.0 wt % |

| Violet Ink | |
|---|---|
| C.I. Pigment Violet 23 | 2.0 wt % |
| dispersant (styrene-acrylic acid copolymer) | 0.8 wt % |
| glycerol | 15.0 wt % |
| 1,2-hexanediol | 10.0 wt % |
| triethanolamine | 0.9 wt % |
| BYK348 (silicone-based surfactant) | 0.3 wt % |
| deionized water | balance |
| total | 100.0 wt % |

| Photoblack Ink | |
|---|---|
| C.I. Pigment Black 7 | 1.5 wt % |
| dispersant (styrene-acrylic acid copolymer) | 1.5 wt % |
| glycerol | 15.0 wt % |
| 1,2-hexanediol | 10.0 wt % |
| triethanolamine | 0.9 wt % |
| BYK348 (silicone-based surfactant) | 0.3 wt % |
| deionized water | balance |
| total | 100.0 wt % |

| Matte Black Ink | |
|---|---|
| C.I. Pigment Black 7 (self-dispersing type) | 6.0 wt % |
| glycerol | 15.0 wt % |
| 1,2-hexanediol | 10.0 wt % |
| triethanolamine | 0.9 wt % |
| BYK348 (silicone-based surfactant) | 0.3 wt % |
| deionized water | balance |
| total | 100.0 wt % |

Ink Set of Example B

Other than replacing the red ink with one having the following composition, the various inks were prepared in the same manner as for the ink set of Example A, and the inks thus obtained were combined to produce the ink set of Example B.

| Red Ink | |
|---|---|
| C.I. Pigment Red 178 | 2.0 wt % |
| dispersant (styrene-acrylic acid copolymer) | 1.0 wt % |
| glycerol | 15.0 wt % |
| 1,2-hexanediol | 10.0 wt % |
| triethanolamine | 0.9 wt % |
| BYK348 (silicone-based surfactant) | 0.3 wt % |
| deionized water | balance |
| total | 100.0 wt % |

Ink Set of Example C

Other than replacing the red ink with one having the following composition, the various inks were prepared in the same manner as for the ink set of Example A, and the inks thus obtained were combined to produce the ink set of Example C.

| Red Ink | |
|---|---|
| C.I. Pigment Red 264 | 2.0 wt % |
| dispersant (styrene-acrylic acid copolymer) | 1.0 wt % |
| glycerol | 15.0 wt % |
| 1,2-hexanediol | 10.0 wt % |
| triethanolamine | 0.9 wt % |
| BYK348 (silicone-based surfactant) | 0.3 wt % |
| deionized water | balance |
| total | 100.0 wt % |

Ink Set of Example D

Other than replacing the red ink with one having the following composition, the various inks were prepared in the same manner as for the ink set of Example A, and the inks thus obtained were combined to produce the ink set of Example D.

| Red Ink | |
|---|---|
| C.I. Pigment Red 178 | 2.0 wt % |
| dispersant (styrene-acrylic acid copolymer) | 0.7 wt % |
| glycerol | 15.0 wt % |
| ethylene glycol | 5.0 wt % |
| 2-pyrrolidone | 2.0 wt % |
| 1,2-hexanediol | 5.0 wt % |
| Olfine E1010 | 0.5 wt % |
| deionized water | balance |
| total | 100.0 wt % |

Ink Set of Example E1

Other than replacing the magenta ink and red ink with ones having the following compositions, the various inks were prepared in the same manner as for the ink set of Example A, and the inks thus obtained were combined to produce the ink set of Example E1.

| Magenta Ink | |
|---|---|
| C.I. Pigment Red 202 | 1.5 wt % |
| dispersant (styrene-acrylic acid copolymer) | 0.8 wt % |
| glycerol | 15.0 wt % |
| 1,2-hexanediol | 10.0 wt % |
| triethanolamine | 0.9 wt % |
| BYK348 (silicone-based surfactant) | 0.3 wt % |
| deionized water | balance |
| total | 100.0 wt % |

-continued

| Red Ink | |
|---|---|
| C.I. Pigment Red 254 | 5.0 wt % |
| dispersant (styrene-acrylic acid copolymer) | 1.0 wt % |
| glycerol | 15.0 wt % |
| 1,2-hexanediol | 10.0 wt % |
| triethanolamine | 0.9 wt % |
| BYK348 (silicone-based surfactant) | 0.3 wt % |
| deionized water | balance |
| total | 100.0 wt % |

Ink Set of Example E2

Other than replacing C.I. Pigment Red 202 used for the magenta ink in the ink set of Example E1 with C.I. Pigment Red 122 (that is, using C.I. Pigment Red 122 in an amount of 1.5 wt % as the pigment for the magenta ink), the various inks were prepared in the same manner as for the ink set of Example E1, and the inks thus obtained were combined to produce the ink set of Example E2.

Ink Set of Example F1

Other than replacing the magenta ink with one having the following composition, the various inks were prepared in the same manner as for the ink set of Example A, and the inks thus obtained were combined to produce the ink set of Example F1.

| Magenta Ink | |
|---|---|
| C.I. Pigment Red 202 | 1.0 wt % |
| C.I. Pigment Red 209 | 1.0 wt % |
| dispersant (styrene-acrylic acid copolymer) | 0.8 wt % |
| glycerol | 15.0 wt % |
| 1,2-hexanediol | 10.0 wt % |
| triethanolamine | 0.9 wt % |
| BYK348 (silicone-based surfactant) | 0.3 wt % |
| deionized water | balance |
| total | 100.0 wt % |

Ink Set of Example F2

Other than replacing C.I. Pigment Red 209 used for the magenta ink in the ink set of Example F1 with C.I. Pigment Red 207 (that is, using 1.0 wt % C.I. Pigment Red 202 and 1.0 wt % C.I. Pigment Red 207 as the pigments for the magenta ink), the various inks were prepared in the same manner as for the ink set of Example F1, and the inks thus obtained were combined to produce the ink set of Example F2.

Ink Set of Example F3

Other than replacing C.I. Pigment Red 202 used for the magenta ink in the ink set of Example F1 with C.I. Pigment Red 122 (that is, using 1.0 wt % C.I. Pigment Red 122 and 1.0 wt % C.I. Pigment Red 209 as the pigments for the magenta ink), the various inks were prepared in the same manner as for the ink set of Example F1, and the inks thus obtained were combined to produce the ink set of Example F3.

Ink Set of Example F4

Other than replacing C.I. Pigment Red 202 used for the magenta ink in the ink set of Example F1 with C.I. Pigment Red 122, and replacing the C.I. Pigment Red 209 with C.I. Pigment Red 207 (that is, using 1.0 wt % C.I. Pigment Red 122 and 1.0 wt % C.I. Pigment Red 207 as the pigments for the magenta ink), the various inks were prepared in the same manner as for the ink set of Example F1, and the inks thus obtained were combined to produce the ink set of Example F4.

Ink Set of Reference Example

Other than changing to yellow ink, magenta ink, cyan ink, red ink, violet ink, photoblack ink, and matte black ink with the following compositions, the various inks were prepared in the same manner as for the ink set of Example A, various inks thus obtained were combined to produce the ink set of the Reference Example.

| Yellow Ink | |
|---|---|
| C.I. Pigment Yellow 74 | 3.0 wt % |
| dispersant (styrene-acrylic acid copolymer) | 1.0 wt % |
| glycerol | 15.0 wt % |
| ethylene glycol | 5.0 wt % |
| 2-pyrrolidone | 2.0 wt % |
| 1,2-hexanediol | 5.0 wt % |
| Olfine E1010 | 0.5 wt % |
| deionized water | balance |
| total | 100.0 wt % |

| Magenta Ink | |
|---|---|
| C.I. Pigment Red 202 | 1.5 wt % |
| dispersant (styrene-acrylic acid copolymer) | 0.5 wt % |
| glycerol | 15.0 wt % |
| ethylene glycol | 5.0 wt % |
| 2-pyrrolidone | 2.0 wt % |
| 1,2-hexanediol | 5.0 wt % |
| Olfine E1010 | 0.5 wt % |
| deionized water | balance |
| total | 100.0 wt % |

| Cyan Ink | |
|---|---|
| C.I. Pigment Blue 15:3 | 1.5 wt % |
| dispersant (styrene-acrylic acid copolymer) | 0.5 wt % |
| glycerol | 15.0 wt % |
| ethylene glycol | 5.0 wt % |
| 2-pyrrolidone | 2.0 wt % |
| 1,2-hexanediol | 5.0 wt % |
| Olfine E1010 | 0.5 wt % |
| deionized water | balance |
| total | 100.0 wt % |

| Red Ink | |
|---|---|
| C.I. Pigment Red 178 | 2.0 wt % |
| dispersant (styrene-acrylic acid copolymer) | 0.7 wt % |
| glycerol | 15.0 wt % |
| ethylene glycol | 5.0 wt % |
| 2-pyrrolidone | 2.0 wt % |
| 1,2-hexanediol | 5.0 wt % |
| Olfine E1010 | 0.5 wt % |
| deionized water | balance |
| total | 100.0 wt % |

-continued

| Violet Ink | |
|---|---|
| C.I. Pigment Violet 23 | 2.0 wt % |
| dispersant (styrene-acrylic acid copolymer) | 0.7 wt % |
| glycerol | 15.0 wt % |
| ethylene glycol | 5.0 wt % |
| 2-pyrrolidone | 2.0 wt % |
| 1,2-hexanediol | 5.0 wt % |
| Olfine E1010 | 0.5 wt % |
| deionized water | balance |
| total | 100.0 wt % |
| Photoblack Ink | |
| C.I. Pigment Black 7 | 1.5 wt % |
| dispersant (styrene-acrylic acid copolymer) | 1.5 wt % |
| glycerol | 15.0 wt % |
| ethylene glycol | 5.0 wt % |
| 2-pyrrolidone | 2.0 wt % |
| 1,2-hexanediol | 5.0 wt % |
| Olfine E1010 | 0.5 wt % |
| deionized water | balance |
| total | 100.0 wt % |
| Matte Black Ink | |
| C.I. Pigment Black 7 (self-dispersing type) | 6.0 wt % |
| glycerol | 15.0 wt % |
| ethylene glycol | 5.0 wt % |
| 2-pyrrolidone | 2.0 wt % |
| 1,2-hexanediol | 5.0 wt % |
| Olfine E1010 | 0.5 wt % |
| deionized water | balance |
| total | 100.0 wt % |

Measurement of L* Value of Ink Aqueous Solution Diluted 1000 Times

The L* values in the Lab colorimetric system specified by CIE for aqueous solutions (diluted 1000 times) of each color of ink used in the ink sets of Examples A to F4 and the Reference Example were measured as follows by using U3300 manufactured by Hitachi Ltd.

Two quartz cells with a volume of 4 mL and measuring 1 cm long, 1 cm wide, and 4 cm high were readied, one of which was used as a sample cell and one as a reference cell. Pure water was added to the cells, and a baseline was measured and set. The reference cell was left as it was, while the pure water in the sample cell was replaced with an ink aqueous solution diluted 1000 times. The ink aqueous solution diluted 1000 times was prepared by putting 1.00 g of each of the inks in the various ink sets of Examples A to F4 and the Reference Example in a 1 L beaker, and immediately adding pure water to bring the total to 1 kg.

The sample cell and the reference cell were then placed in a measurement unit, and the L* values were measured under conditions comprising a 2.0 nm slit width of the light source lamp, a scan speed of the measurement interval of 600 nm/min, a transmissivity of 0.0 to 100.0% T, between 380 and 800 nm, a D65 light source, a view angle of 2 degrees, a photomultiplier tube voltage of 200 V, and with a D2 lamp and a WI lamp used as the light source lamp switched at 340 nm. The L* values of the aqueous solution of each ink diluted 1000 times are given below.

Ink Set of Example A
(Y): 91.30, (M): 81.08, (C): 79.84, (R): 68.14, (Vi): 49.01, (PB): 54.40, (MB): 4.55

Ink Set of Example B
(Y): 91.30, (M): 81.08, (C): 79.84, (R): 70.89, (Vi): 49.01, (PB): 54.40, (MB): 4.55

Ink Set of Example C
(Y): 91.30, (M): 81.08, (C): 79.84, (R): 66.59, (Vi): 49.01, (PB): 54.40, (MB): 4.55

Ink Set of Example D
(Y): 91.30, (M): 81.08, (C): 79.84, (R): 57.71, (Vi): 49.01, (PB): 54.40, (MB): 4.55

Ink Set of Example E1
(Y): 91.30, (M): 84.18, (C): 79.84, (R): 57.71, (Vi): 49.01, (PB): 54.40, (MB): 4.55

Ink Set of Example E2
(Y): 91.30, (M): 84.25, (C): 79.84, (R): 57.71, (Vi): 49.01, (PB): 54.40, (MB): 4.55

Ink Set of Example F1
(Y): 91.30, (M): 88.67, (C): 79.84, (R): 68.14, (Vi): 49.01, (PB): 54.40, (MB): 4.55

Ink Set of Example F2
(Y): 91.30, (M): 89.80, (C): 79.84, (R): 68.14, (Vi): 49.01, (PB): 54.40, (MB): 4.55

Ink Set of Example F3
(Y): 91.30, (M): 89.50, (C): 79.84, (R): 68.14, (Vi): 49.01, (PB): 54.40, (MB): 4.55

Ink Set of Example F4
(Y): 91.30, (M): 88.90, (C): 79.84, (R): 68.14, (Vi): 49.01, (PB): 54.40, (MB): 4.55

Ink Set of Reference Example
(Y): 91.30, (M): 84.18, (C): 79.84, (R): 70.89, (Vi): 49.01, (PB): 54.40, (MB): 4.55

Test Example 1

Application to a Medium Having a Coating Layer

Using the ink sets of Examples A to F4 and the Reference Example, printing was performed at a duty of 10 to 100% (if monochromatic) or 10 to 120% (if a plurality of inks were mixed as needed) on PGPP (PM photographic paper made by Seiko Epson) as the medium having a coating layer, using a PM900C inkjet printer (made by Seiko Epson). In this printing, when a mixed color portion of secondary or higher color was formed, this mixed color portion was formed by at least two YMC inks plus red and violet inks. In this case, the various inks were used in the favorable combinations discussed above according to the ranges of the above-mentioned sensory color indices a* and b*. More specifically, when forming a mixed color portion in which the above-mentioned sensory color indices a* and b* were within the ranges of a*=approximately −50 to approximately 50 and b*=approximately −50 to approximately 50, YMC inks, red and violet inks, plus a photoblack ink were used, and a graphic image of the "automobile" image of the Japanese Standards Association SCID samples was printed at 1440×720 dpi.

Similarly, recorded matter was obtained on PM photographic paper at 1440×720 dpi using a PM900C according to the following ink weight tables (Tables 1 and 2). Color inks ① and ② in Tables 1 and 2 below indicate two inks out of yellow ink, magenta ink, cyan ink, red ink, and violet ink, while ink ③ in Table 2 below indicates one ink out of red ink, violet ink, and photoblack ink.

TABLE 1

(This table is a matrix, with each cell specifying a printing location)

Color ink ①

| 13 | 13 | 12 | 11 | 10 | 8 | 6 | 5 | 3 | 1 | 0 |
|----|----|----|----|----|---|---|---|---|---|---|
| 12 | 11 | 11 | 10 | 9  | 7 | 6 | 4 | 3 | 1 | 0 |
| 10 | 10 | 10 | 9  | 8  | 6 | 5 | 4 | 2 | 1 | 0 |
| 9  | 9  | 8  | 8  | 7  | 6 | 4 | 3 | 2 | 1 | 0 |
| 8  | 8  | 7  | 7  | 6  | 5 | 4 | 3 | 2 | 1 | 0 |
| 7  | 6  | 6  | 6  | 5  | 4 | 3 | 2 | 1 | 1 | 0 |
| 5  | 5  | 5  | 4  | 4  | 3 | 3 | 2 | 1 | 1 | 0 |
| 3  | 3  | 2  | 2  | 2  | 2 | 1 | 1 | 1 | 0 | 0 |

Color ink ②

| 0 | 1 | 3 | 5 | 6 | 8 | 10 | 11 | 12 | 13 | 13 |
|---|---|---|---|---|---|----|----|----|----|----|
| 0 | 1 | 3 | 4 | 6 | 7 | 9  | 10 | 11 | 11 | 12 |
| 0 | 1 | 2 | 4 | 5 | 6 | 8  | 9  | 10 | 10 | 10 |
| 0 | 1 | 2 | 3 | 4 | 6 | 7  | 5  | 8  | 9  | 9  |
| 0 | 1 | 2 | 3 | 4 | 5 | 6  | 7  | 7  | 8  | 8  |
| 0 | 1 | 1 | 2 | 3 | 4 | 5  | 6  | 6  | 6  | 7  |
| 0 | 1 | 1 | 2 | 3 | 3 | 4  | 4  | 5  | 5  | 5  |
| 0 | 0 | 1 | 1 | 1 | 2 | 2  | 2  | 2  | 3  | 3  |

TABLE 2

(This table is a matrix, with each cell specifying a printing location)

Color ink ①

| 13 | 13 | 12 | 11 | 10 | 8 | 6 | 5 | 3 | 1 | 0 |
|----|----|----|----|----|---|---|---|---|---|---|
| 12 | 11 | 11 | 10 | 9  | 7 | 6 | 4 | 3 | 1 | 0 |
| 10 | 10 | 10 | 9  | 8  | 6 | 5 | 4 | 2 | 1 | 0 |
| 9  | 9  | 8  | 8  | 7  | 6 | 4 | 3 | 2 | 1 | 0 |
| 8  | 8  | 7  | 7  | 6  | 5 | 4 | 3 | 2 | 1 | 0 |
| 7  | 6  | 6  | 6  | 5  | 4 | 3 | 2 | 1 | 1 | 0 |
| 5  | 5  | 5  | 4  | 4  | 3 | 3 | 2 | 1 | 1 | 0 |
| 3  | 3  | 2  | 2  | 2  | 2 | 1 | 1 | 1 | 0 | 0 |

Color ink ②

| 0 | 1 | 3 | 5 | 6 | 8 | 10 | 11 | 12 | 13 | 13 |
|---|---|---|---|---|---|----|----|----|----|----|
| 0 | 1 | 3 | 4 | 6 | 7 | 9  | 10 | 11 | 11 | 12 |
| 0 | 1 | 2 | 4 | 5 | 6 | 8  | 9  | 10 | 10 | 10 |
| 0 | 1 | 2 | 3 | 4 | 6 | 7  | 8  | 8  | 9  | 9  |
| 0 | 1 | 2 | 3 | 4 | 5 | 6  | 7  | 7  | 8  | 8  |
| 0 | 1 | 1 | 2 | 3 | 4 | 5  | 5  | 6  | 6  | 7  |
| 0 | 1 | 1 | 2 | 3 | 3 | 4  | 4  | 5  | 5  | 5  |
| 0 | 0 | 1 | 1 | 1 | 2 | 2  | 2  | 2  | 3  | 3  |

Ink ③

| 0  | 0  | 0  | 0  | 0  | 0  | 0  | 0  | 0  | 0  | 0  |
|----|----|----|----|----|----|----|----|----|----|----|
| 1  | 1  | 1  | 2  | 2  | 2  | 2  | 2  | 1  | 1  | 1  |
| 3  | 3  | 3  | 3  | 3  | 3  | 3  | 3  | 3  | 3  | 3  |
| 4  | 4  | 4  | 5  | 5  | 5  | 5  | 5  | 4  | 4  | 4  |
| 5  | 6  | 6  | 6  | 6  | 6  | 6  | 6  | 6  | 6  | 5  |
| 7  | 7  | 7  | 6  | 8  | 8  | 6  | 8  | 7  | 7  | 7  |
| 8  | 8  | 9  | 10 | 10 | 10 | 10 | 10 | 9  | 8  | 8  |
| 10 | 11 | 12 | 13 | 13 | 13 | 13 | 13 | 12 | 11 | 10 |

The monochromatic L* values (L* values of images produced with each ink other than black) at a duty of 20% on PM photographic paper here were as follows (these L* values were measured using an SPM-50 made by Gretag, with a D50 light source, at a view angle of 2 degrees).

L* values at 20% duty on PM photographic paper using the ink set of Example A: (Y): 90.07, (M): 74.34, (C): 74.41, (R): 67.66, (Vi): 52.17

L* values at 20% duty on PM photographic paper using the ink set of Example B: (Y): 90.07, (M): 74.34, (C): 74.41, (R): 67.63, (Vi): 52.17

L* values at 20% duty on PM photographic paper using the ink set of Example C: (Y): 90.07, (M): 74.34, (C): 74.41, (R): 63.30, (Vi): 52.17

L* values at 20% duty on PM photographic paper using the ink set of Example D: (Y): 90.07, (M): 74.34, (C): 74.41, (R): 62.20, (Vi): 52.17

L* values at 20% duty on PM photographic paper using the ink set of Example E1: (Y): 90.07, (M): 75.01, (C): 74.41, (R): 62.20, (Vi): 52.17

L* values at 20% duty on PM photographic paper using the ink set of Example E2: (Y): 90.07, (M): 75.25, (C): 74.41, (R): 62.20, (Vi): 52.17

L* values at 20% duty on PM photographic paper using the ink set of Example F1: (Y): 90.07, (M): 74.33, (C): 74.41, (R): 67.66, (Vi): 52.17

L* values at 20% duty on PM photographic paper using the ink set of Example F2: (Y): 90.07, (M): 75.21, (C): 74.41, (R): 67.66, (Vi): 52.17

L* values at 20% duty on PM photographic paper using the ink set of Example F3: (Y): 90.07, (M): 75.11, (C): 74.41, (R): 67.66, (Vi): 52.17

L* values at 20% duty on PM photographic paper using the ink set of Example F4: (Y): 90.07, (M): 75.15, (C): 74.41, (R): 67.66, (Vi): 52.17

L* values at 20% duty on PM photographic paper using the ink set of the Reference Example: (Y): 90.07, (M): 75.01, (C): 74.41, (R): 67.63, (Vi): 52.17

Evaluation of Gamut Volume

The gamut volume of the recorded matter obtained above was measured. Measuring the gamut volume involved using a Gretag-Macbeth SPM-50 made by Gretag, with a D50 light source and no filter, at a view angle of 2°, and finding the volume when the volume of a three-dimensional object composed of L*=1, a*=1, and b*=1 was 1 with the L*a*b* colorimetric system specified by CIE. As a result, all of the printed images obtained with the ink sets of Examples A to F4 and the Reference Example had a gamut volume of approximately 650,000 or higher, meaning that these images had a wide color reproduction range.

Evaluation of Granularity

The L* values were at least 50 for the portions with a duty of 20% or less of the recorded matter obtained with the ink sets of Examples A to F4 and the Reference Example (except when the ink ③ was a photoblack ink), and all of the images were of excellent quality, and it was difficult to see any granularity.

Evaluation of Gloss Imparting Property

Florescent light was shined on the printed portions from a distance of about 2 meters, and it was determined visually whether the outline of the florescent lamp could be made out. As a result, all of the printed images obtained with the ink sets of Examples A to F4 and the Reference Example had excellent gloss, and the shape of the illumination could be made out.

Test Example 2

Application to Plain Paper

Evaluation of YMR Saturation and Brightness

Using the ink sets of Examples A to F4 and the Reference Example, and using a PM900C inkjet printer (made by Seiko Epson), recorded matter was obtained by printing on plain paper (Xerox P, made by Xerox) at 720×720 dpi and at a maximum duty of 66% (maximum amount of ink: 7.2 mg/inch$^2$) when yellow ink, magenta ink, and red ink were each used alone, and at a maximum duty of 86% (maximum amount of ink: 10.5 mg/inch$^2$) when yellow ink, magenta ink, red ink, and matte black ink were mixed. In this printing, when a mixed color portion of secondary or higher color was formed, it was formed in the same manner as in Test Example 1. Specifically, it was formed according to the weight tables given below for the various color inks (Tables 3 and 4).

TABLE 3

(This table is a matrix, with each cell specifying a printing location)

Yellow ink

| | | | | | | | | | | |
|---|---|---|---|---|---|---|---|---|---|---|
| 7.2 | 7.5 | 7.5 | 7.4 | 6.3 | 5.3 | 4.2 | 3.2 | 1.9 | 0.8 | 0.0 |
| 6.5 | 6.7 | 6.8 | 6.6 | 5.7 | 4.7 | 3.8 | 2.8 | 1.7 | 0.7 | 0.0 |
| 5.8 | 6.0 | 6.0 | 5.9 | 5.0 | 4.2 | 3.4 | 2.5 | 1.5 | 0.7 | 0.0 |
| 5.0 | 5.2 | 5.3 | 5.1 | 4.4 | 3.7 | 2.9 | 2.2 | 1.3 | 0.6 | 0.0 |
| 4.3 | 4.5 | 4.5 | 4.4 | 3.8 | 3.2 | 2.5 | 1.9 | 1.1 | 0.5 | 0.0 |
| 3.5 | 3.7 | 3.8 | 3.7 | 3.2 | 2.6 | 2.1 | 1.6 | 0.9 | 0.4 | 0.0 |
| 2.9 | 3.0 | 3.0 | 2.9 | 2.5 | 2.1 | 1.7 | 1.3 | 0.8 | 0.3 | 0.0 |
| 1.4 | 1.5 | 1.5 | 1.5 | 1.3 | 1.1 | 0.8 | 0.6 | 0.4 | 0.2 | 0.0 |

Magenta ink

| | | | | | | | | | | |
|---|---|---|---|---|---|---|---|---|---|---|
| 0.0 | 0.8 | 1.9 | 3.2 | 4.2 | 5.3 | 6.3 | 7.4 | 7.5 | 7.5 | 7.2 |
| 0.0 | 0.7 | 1.7 | 2.8 | 3.8 | 4.7 | 5.7 | 6.6 | 6.8 | 6.7 | 6.5 |
| 0.0 | 0.7 | 1.5 | 2.5 | 3.4 | 4.2 | 5.0 | 5.9 | 6.0 | 6.0 | 5.8 |
| 0.0 | 0.6 | 1.3 | 2.2 | 2.9 | 3.7 | 4.4 | 5.1 | 5.3 | 5.2 | 5.0 |
| 0.0 | 0.5 | 1.1 | 1.9 | 2.5 | 3.2 | 3.8 | 4.4 | 4.5 | 4.5 | 4.3 |
| 0.0 | 0.4 | 0.9 | 1.6 | 2.1 | 2.6 | 3.2 | 3.7 | 3.8 | 3.7 | 3.6 |
| 0.0 | 0.3 | 0.8 | 1.3 | 1.7 | 2.1 | 2.5 | 2.9 | 3.0 | 3.0 | 2.9 |
| 0.0 | 0.2 | 0.4 | 0.6 | 0.8 | 1.1 | 1.3 | 1.5 | 1.5 | 1.5 | 1.4 |

Red ink

| | | | | | | | | | | |
|---|---|---|---|---|---|---|---|---|---|---|
| 0.7 | 0.8 | 0.9 | 1.1 | 1.1 | 1.1 | 1.1 | 1.1 | 0.9 | 0.8 | 0.7 |
| 1.4 | 1.7 | 1.9 | 2.1 | 2.1 | 2.1 | 2.1 | 2.1 | 1.9 | 1.7 | 1.4 |
| 2.2 | 2.5 | 2.8 | 3.2 | 3.2 | 3.2 | 3.2 | 3.2 | 2.8 | 2.5 | 2.2 |
| 2.9 | 3.3 | 3.8 | 4.2 | 4.2 | 4.2 | 4.2 | 4.2 | 3.8 | 3.3 | 2.9 |
| 3.6 | 4.1 | 4.7 | 5.3 | 5.3 | 5.3 | 5.3 | 5.3 | 4.7 | 4.1 | 3.6 |
| 4.3 | 5.0 | 5.6 | 6.3 | 6.3 | 6.3 | 6.3 | 6.3 | 5.6 | 5.0 | 4.3 |
| 5.8 | 6.6 | 7.5 | 8.4 | 8.4 | 8.4 | 8.4 | 8.4 | 7.5 | 6.6 | 5.8 |

TABLE 4

(This table is a matrix, with each cell specifying a printing location)

Yellow ink

| | | | | | | | | | | |
|---|---|---|---|---|---|---|---|---|---|---|
| 7.1 | 7.4 | 7.4 | 7.3 | 6.2 | 5.2 | 4.1 | 3.1 | 1.8 | 0.7 | 0.0 |
| 8.4 | 6.6 | 6.7 | 6.5 | 5.6 | 4.6 | 3.7 | 2.7 | 1.6 | 0.6 | 0.0 |
| 5.7 | 5.9 | 5.9 | 5.8 | 4.9 | 4.1 | 3.3 | 2.4 | 1.4 | 0.6 | 0.0 |
| 4.9 | 5.1 | 5.2 | 5.0 | 4.3 | 3.6 | 2.8 | 2.1 | 1.2 | 0.6 | 0.0 |
| 4.2 | 4.4 | 4.4 | 4.3 | 3.7 | 3.1 | 2.4 | 1.8 | 1.0 | 0.4 | 0.0 |
| 3.5 | 3.6 | 3.7 | 3.6 | 3.1 | 2.5 | 2.0 | 1.5 | 0.8 | 0.3 | 0.0 |
| 2.8 | 2.9 | 2.9 | 2.8 | 2.4 | 2.0 | 1.6 | 1.2 | 0.7 | 0.2 | 0.0 |
| 1.3 | 1.4 | 1.4 | 1.4 | 1.2 | 1.0 | 0.7 | 0.5 | 0.3 | 0.1 | 0.0 |
| 7.0 | 7.3 | 7.3 | 7.2 | 6.1 | 5.1 | 4.0 | 3.0 | 1.7 | 0.6 | 0.0 |
| 6.3 | 6.5 | 6.6 | 6.4 | 5.5 | 4.5 | 3.5 | 2.6 | 1.5 | 0.5 | 0.0 |
| 5.6 | 5.8 | 5.8 | 5.7 | 4.8 | 4.0 | 3.2 | 2.3 | 1.3 | 0.5 | 0.0 |
| 4.8 | 5.0 | 5.1 | 4.9 | 4.2 | 3.5 | 2.7 | 2.0 | 1.1 | 0.4 | 0.0 |
| 4.1 | 4.3 | 4.3 | 4.2 | 3.6 | 3.0 | 2.3 | 1.7 | 0.9 | 0.3 | 0.0 |
| 3.4 | 3.5 | 3.6 | 3.5 | 3.0 | 2.4 | 1.9 | 1.4 | 0.7 | 0.2 | 0.0 |
| 2.7 | 2.8 | 2.8 | 2.7 | 2.3 | 1.9 | 1.5 | 1.1 | 0.6 | 0.1 | 0.0 |
| 1.2 | 1.3 | 1.3 | 1.3 | 1.1 | 0.9 | 0.6 | 0.4 | 0.2 | 0.0 | 0.0 |

Magenta ink

| | | | | | | | | | | |
|---|---|---|---|---|---|---|---|---|---|---|
| 0.0 | 0.7 | 1.8 | 3.1 | 4.1 | 5.2 | 6.2 | 7.3 | 7.4 | 7.4 | 7.1 |
| 0.0 | 0.6 | 1.6 | 2.7 | 3.7 | 4.6 | 5.6 | 6.5 | 6.7 | 6.6 | 6.4 |
| 0.0 | 0.6 | 1.4 | 2.4 | 3.3 | 4.1 | 4.9 | 5.8 | 5.9 | 5.9 | 5.7 |
| 0.0 | 0.5 | 1.2 | 2.1 | 2.8 | 3.6 | 4.3 | 5.0 | 5.2 | 5.1 | 4.9 |
| 0.0 | 0.4 | 1.0 | 1.8 | 2.4 | 3.1 | 3.7 | 4.3 | 4.4 | 4.4 | 4.2 |
| 0.0 | 0.3 | 0.8 | 1.5 | 2.0 | 2.5 | 3.1 | 3.8 | 3.7 | 3.6 | 3.5 |
| 0.0 | 0.2 | 0.7 | 1.2 | 1.6 | 2.0 | 2.4 | 2.8 | 2.9 | 2.9 | 2.8 |
| 0.0 | 0.1 | 0.3 | 0.6 | 0.7 | 1.0 | 1.2 | 1.4 | 1.4 | 1.4 | 1.3 |
| 0.0 | 0.6 | 1.7 | 3.0 | 4.0 | 5.1 | 6.1 | 7.2 | 7.3 | 7.3 | 7.0 |
| 0.0 | 0.5 | 1.5 | 2.6 | 3.6 | 4.5 | 5.5 | 6.4 | 6.6 | 6.5 | 6.3 |
| 0.0 | 0.5 | 1.3 | 2.3 | 3.2 | 4.0 | 4.8 | 5.7 | 5.8 | 5.8 | 5.6 |
| 0.0 | 0.4 | 1.1 | 2.0 | 2.7 | 3.5 | 4.2 | 4.9 | 5.1 | 5.0 | 4.8 |
| 0.0 | 0.3 | 0.9 | 1.7 | 2.3 | 3.0 | 3.6 | 4.2 | 4.3 | 4.3 | 4.1 |
| 0.0 | 0.2 | 0.7 | 1.4 | 1.9 | 2.4 | 3.0 | 2.5 | 3.6 | 3.5 | 3.4 |

TABLE 4-continued (This table is a matrix, with each cell specifying a printing location)

| | | | | | | | | | | |
|---|---|---|---|---|---|---|---|---|---|---|
| 0.0 | 0.1 | 0.6 | 1.1 | 1.5 | 1.9 | 2.3 | 2.7 | 2.8 | 2.8 | 2.7 |
| 0.0 | 0.0 | 0.2 | 0.4 | 0.6 | 0.9 | 1.1 | 1.3 | 1.3 | 1.3 | 1.2 |

Red ink

| | | | | | | | | | | |
|---|---|---|---|---|---|---|---|---|---|---|
| 0.6 | 0.7 | 0.8 | 1.0 | 1.0 | 1.0 | 1.0 | 1.0 | 0.8 | 0.7 | 0.6 |
| 1.3 | 1.6 | 1.8 | 2.0 | 2.0 | 2.0 | 2.0 | 2.0 | 1.8 | 1.6 | 1.3 |
| 2.1 | 2.4 | 2.7 | 3.1 | 3.1 | 3.1 | 3.1 | 3.1 | 2.7 | 2.4 | 2.1 |
| 2.8 | 3.2 | 3.7 | 4.1 | 4.1 | 4.1 | 4.1 | 4.1 | 3.7 | 3.2 | 2.8 |
| 3.5 | 4.0 | 4.6 | 5.2 | 5.2 | 5.2 | 5.2 | 5.2 | 4.5 | 4.0 | 3.5 |
| 4.2 | 4.9 | 5.5 | 6.2 | 6.2 | 6.2 | 6.2 | 6.2 | 5.5 | 4.9 | 4.2 |
| 5.7 | 6.5 | 7.4 | 8.3 | 8.3 | 8.3 | 8.3 | 8.3 | 7.4 | 5.5 | 5.7 |
| 0.5 | 0.6 | 0.7 | 0.9 | 0.9 | 0.9 | 0.9 | 0.9 | 0.7 | 0.6 | 0.5 |
| 1.2 | 1.5 | 1.7 | 1.9 | 1.9 | 1.9 | 1.9 | 1.9 | 1.7 | 1.5 | 1.2 |
| 2.0 | 2.3 | 2.6 | 3.0 | 3.0 | 3.0 | 3.0 | 3.0 | 2.6 | 2.3 | 2.0 |
| 2.7 | 3.1 | 3.6 | 4.0 | 4.0 | 4.0 | 4.0 | 4.0 | 3.6 | 3.1 | 2.7 |
| 3.4 | 3.9 | 4.5 | 5.1 | 5.1 | 5.1 | 5.1 | 5.1 | 4.5 | 3.9 | 3.4 |
| 4.1 | 4.8 | 5.4 | 6.1 | 6.1 | 6.1 | 6.1 | 6.1 | 5.4 | 4.8 | 4.1 |
| 5.6 | 6.4 | 7.3 | 8.2 | 8.2 | 8.2 | 8.2 | 8.2 | 7.3 | 6.4 | 5.6 |

Photoblack ink

| | | | | | | | | | | |
|---|---|---|---|---|---|---|---|---|---|---|
| 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 |
| 0.1 | 0.1 | 0.1 | 0.1 | 0.1 | 0.1 | 0.1 | 0.1 | 0.1 | 0.1 | 0.1 |
| 0.2 | 0.2 | 0.2 | 0.2 | 0.2 | 0.2 | 0.2 | 0.2 | 0.2 | 0.2 | 0.2 |
| 0.2 | 0.2 | 0.2 | 0.2 | 0.2 | 0.2 | 0.2 | 0.2 | 0.2 | 0.2 | 0.2 |
| 0.2 | 0.2 | 0.2 | 0.2 | 0.2 | 0.2 | 0.2 | 0.2 | 0.2 | 0.2 | 0.2 |
| 0.2 | 0.2 | 0.2 | 0.2 | 0.2 | 0.2 | 0.2 | 0.2 | 0.2 | 0.2 | 0.2 |
| 0.2 | 0.2 | 0.2 | 0.2 | 0.2 | 0.2 | 0.2 | 0.2 | 0.2 | 0.2 | 0.2 |
| 0.2 | 0.2 | 0.2 | 0.2 | 0.2 | 0.2 | 0.2 | 0.2 | 0.2 | 0.2 | 0.2 |
| 0.2 | 0.2 | 0.2 | 0.2 | 0.2 | 0.2 | 0.2 | 0.2 | 0.2 | 0.2 | 0.2 |

The recorded matter thus obtained was measured using a Gretag-Macbeth SPM-50 made by Gretag, with a D50 light source and no filter, at a view angle of 2°, and the values of the Lab colorimetric system specified by CIE were obtained. Each example was evaluated on the basis of the corresponding Lab calorimetric values.

Example A: FIG. 1 is a graph of the relation between saturation and a hue angle of 0.0 to 60.0 on the basis of the above values. Similarly, FIG. 2 is a graph of the relation between brightness and a saturation of 45.0 to 60.0 on the basis of the above-mentioned Lab calorimetric values (a comparison of high-saturation and high-brightness coloration). As is clear from FIGS. 1 and 2, the images of the recorded matter obtained with the ink set of Example A have much better saturation at a hue angle of 0 to 20 degrees, and the coloration of the image has higher saturation and lower brightness, than with the images of the recorded matter obtained with the ink set of the Reference Example.

Example B: FIG. 5 is a graph of the relation between saturation and a hue angle of 0.0 to 60.0 on the basis of the above values. Similarly, FIG. 6 is a graph of the relation between brightness and a saturation of 45.0 to 60.0 on the basis of the above-mentioned Lab calorimetric values (a comparison of high-saturation and high-brightness coloration). As is clear from FIGS. 5 and 6, the images of the recorded matter obtained with the ink set of Example B have much better saturation at a hue angle of 0 to 20 degrees, and the coloration of the image has higher saturation and lower brightness, than with the images of the recorded matter obtained with the ink set of the Reference Example. It can also be seen from FIGS. 5 and 6 that excellent coloration is obtained at a low ink weight. This means that paper wrinkling is less apt to occur.

Example C: It can be seen from the above-mentioned values that the images of the recorded matter obtained with the ink set of Example C have much better saturation at a hue angle of 0 to 20 degrees, and the coloration of the image has higher saturation and lower brightness, than with the images of the recorded matter obtained with the ink set of the Reference Example.

Example D: It can be seen from the above-mentioned values that the images of the recorded matter obtained with the ink set of Example D have much better saturation at a hue angle of 0 to 20 degrees and at a hue angle of 20 to 40 degrees, and the coloration of the image has higher saturation and lower brightness, than with the images of the recorded matter obtained with the ink set of the Reference Example.

Examples E1 and E2: It can be seen from the above-mentioned values that the images of the recorded matter obtained with the ink sets of Examples E1 and E2 have much better saturation at a hue angle of 20 to 40 degrees, and the coloration of the image has higher saturation and lower brightness, than with the images of the recorded matter obtained with the ink set of the Reference Example.

Examples F1 to F4: It can be seen from the above-mentioned values that the images of the recorded matter obtained with the ink sets of Examples F1 to F4 have much better saturation at a hue angle of 0 to 20 degrees, and the coloration of the image has higher saturation and lower brightness, than with the images of the recorded matter obtained with the ink set of the Reference Example.

Evaluation of Saturation and Brightness of MCVi, and Coloration Evaluation

Using the ink sets of Examples A to F4 and the Reference Example, and using a PM900C inkjet printer (made by Seiko Epson), recorded matter was obtained by printing on plain paper (Xerox P, made by Xerox) at 720×720 dpi and at a maximum duty of 66% (maximum amount of ink: 7.2 mg/inch$^2$) when magenta ink, cyan ink, and violet ink were each used alone, and at a maximum duty of 86% (maximum amount of ink: 10.5 mg/inch$^2$) when magenta ink, cyan ink, and violet ink were mixed. In this printing, when a mixed color portion of secondary or higher color was formed, it was formed in the same manner as in Test Example 1. Specifically, it was formed according to the weight tables given above for the various color inks (Tables 3 and 4).

The recorded matter thus obtained was measured using a Gretag-Macbeth SPM-50 made by Gretag, with a D50 light source and no filter, at a view angle of 2°, and the values of the Lab calorimetric system specified by CIE were obtained. Each example was evaluated on the basis of the corresponding Lab colorimetric values.

Example A: FIG. 3 is a graph of the relation between saturation and a hue angle of 240.0 to 360.0 on the basis of the above values. Similarly, FIG. 4 is a graph of the relation between brightness and a saturation of 30.0 to 60.0 on the basis of the above-mentioned Lab calorimetric values (a comparison of high-saturation and high-brightness coloration). As is clear from FIGS. 3 and 4, the images of the recorded matter obtained with the ink set of Example A have images with excellent coloration comparable to that of the recorded matter obtained using the ink set of the Reference Example.

Examples B, C, and D: It can be seen from the above-mentioned values that the images of the recorded matter obtained with the ink sets of Examples B, C, and D have images with excellent coloration comparable to that of the recorded matter obtained using the ink set of the Reference Example.

Examples E1 and E2: It can be seen from the above-mentioned values that with the images of the recorded matter obtained with the ink sets of Examples E1 and E2, red with a saturation of at least 60 is obtained at a hue angle of 20 to 30 degrees, and the recorded matter has images with superior coloration, which could not be obtained with recorded matter obtained using the ink set of the Reference Example.

Examples F1 to F4: It can be seen from the above-mentioned values that with the images of the recorded matter obtained with the ink sets of Examples 1 and 4, magenta with a saturation of at least 50 is obtained at a hue angle of 0 to 10 degrees, and the recorded matter has images with superior coloration, which could not be obtained with recorded matter obtained using the ink set of the Reference Example.

Test Example 3

Application to a Medium Having a Coating Layer (Part 2)

Using the ink sets of Examples C and the Reference Example, and using a PM900C inkjet printer (made by Seiko Epson), recorded matter was obtained by printing on PGPP (PM photographic paper made by Seiko Epson) as the medium having a coating layer, at 720×720 dpi and at a maximum duty of 100% (maximum amount of ink: 13 mg/inch$^2$) when yellow ink, magenta ink, and red ink were each used alone, and at a maximum duty of 120% (maximum amount of ink: 16 mg/inch$^2$) when yellow ink, magenta ink, red ink, and matte black ink were mixed. In this printing, when a mixed color portion of secondary or higher color was formed, it was formed in the same manner as in Test Example 1.

Evaluation of Metamerism

The recorded matter thus obtained was measured using a Gretag-Macbeth SPM-50 made by Gretag, with no filter, at a view angle of 2°, and with two different light sources comprising a D50 light source and an A light source, and the values of the Lab colorimetric system specified by CIE were obtained. It can be seen from these values that the images of the recorded matter obtained with the ink set of Example C have coloration in which the L* value is 53 or less at a hue angle of 20 to 30 degrees, and that higher-quality images with less metamerism are obtained than with the images of the recorded matter obtained with the ink set of the Reference Example.

Test Example 4

Application to a Medium Having a Coating Layer (Part 3)

Using the ink sets of Examples C and the Reference Example, and using a PM900C inkjet printer (made by Seiko Epson), recorded matter was obtained by printing on PGPP (PM photographic paper made by Seiko Epson) as the medium having a coating layer, at 720×720 dpi and at a maximum duty of 100% (maximum amount of ink: 13 mg/inch$^2$) when yellow ink, magenta ink, and red ink were each used alone, and at a maximum duty of 120% (maximum amount of ink: 16 mg/inch$^2$) when yellow ink, magenta ink, red ink, and matte black ink were mixed. In this printing, when a mixed color portion of secondary or higher color was formed, it was formed in the same manner as in Test Example 1.

Evaluation of Metamerism

The recorded matter thus obtained was measured using a Gretag-Macbeth SPM-50 made by Gretag, with no filter, at a view angle of 2°, and with two different light sources comprising a D50 light source and an A light source, and the values of the Lab calorimetric system specified by CIE were obtained. It can be seen from these values that the images of the recorded matter obtained with the ink set of Example C have coloration in which the L* value is 53 or less at a hue angle of 20 to 30 degrees, and that higher-quality images with less metamerism are obtained than with the images of the recorded matter obtained with the ink set of the Reference Example.

Other Evaluation

The following evaluations were performed for all of the images on plain paper and PGPP that were evaluated above. A different, unique evaluation was conducted for each example (except Example C).

Example A: The reflected light and metamerism of the images of the obtained recorded matter were examined, which revealed that all of the printed images obtained with the ink set of Example A reflected white light and had reduced metamerism.

Example B: The magenta coloration and the metamerism of the images were examined, which revealed that all of the printed images obtained with the ink set of Example B had a magenta color with excellent coloration at a high saturation, and had reduced metamerism.

Example D: The coloration of the orange-red region and the metamerism of the images were examined, which revealed that all of the printed images obtained with the ink set of Example D had a region of orange-red color with excellent coloration at a high saturation, and had reduced metamerism.

Examples E1 and E2: The coloration of the orange-red region and the gas resistance were examined, which revealed that all of the printed images obtained with the ink sets of Examples E1 and E2 had a region of orange-red color with excellent coloration at a high saturation and low brightness, and had excellent gas resistance.

Examples F1 to F4: The obtained recorded matter was exposed to an atmosphere with a specific ozone concentration, which confirmed that the printed images obtained with the ink sets of Examples F1 to F4 clearly underwent less fading than the printed images obtained with the ink set of the Reference Example.

The present invention has industrial applicability as an ink set that has a wide color reproduction range, has high saturation, produces a glossy recorded image with no pronounced granularity caused by dot expression, greatly suppresses granularity caused by dot expression particularly when applied to a medium having a coating layer, and allows a recorded image with outstanding coloration to be obtained when applied to plain paper, as well as a recording method, recording system, and recorded matter in which said ink set is used.

I claim:

1. An ink set comprising at least yellow ink (Y), magenta ink (M), cyan ink (C), and red ink (R), wherein the L* values in the Lab calorimetric system specified by CIE for aqueous solutions of each ink diluted 1000 times are within the following ranges:

(Y): at least 89 and no more than 94, (C): at least 74 and no more than 87, wherein the L* value for the magenta ink (M) is within a range of at least 76 and less than 83, and the L* value for the red ink (R) is within the range of at least 67.5 and less than 69, and wherein the magenta ink contains 1.7 to 3.0 wt % C.I. Pigment Violet 19, and the red ink contains 2.2 to 2.8 wt % C.I. Pigment Red 177.

2. The ink set according to claim 1, wherein the yellow ink contains 2.0 to 4.0 wt % C.I. Pigment Yellow 74, and the cyan ink contains 0.5 to 2.5 wt % C.I. Pigment Blue 15:3.

3. The ink set according to claim 1, further comprising a violet ink (Vi) whose L* value in the Lab calorimetric system specified by CIE for an aqueous solution diluted 1000 times is within a range of at least 40 and no more than 58.

4. The ink set according to claim 3, wherein the violet ink contains 1.0 to 3.0 wt % C.I. Pigment Violet 23.

5. The ink set according to claim 1, wherein each of the inks contains a pigment as a colorant and a dispersant for dispersing said pigment, said dispersant being contained in an amount of 20 to 80 wt % with respect to said pigment.

6. The ink set according to claim 1, further comprising a photoblack ink (PK) containing 3.0 wt % carbon black.

7. The ink set according to claim 6, wherein the photoblack ink contains a pigment as a colorant and a dispersant for dispersing said pigment, said dispersant being contained in an amount of 60 to 120 wt % with respect to said pigment.

8. The ink set according to claim 1, further comprising a matte black ink (MK) containing 3.0 wt % carbon black.

9. The ink set according to claim 8, wherein the matte black ink contains a self-dispersing pigment as a colorant, and contains no dispersant.

10. The ink set according to claim 1, wherein each ink contains 0.1 to 30 wt % high-boiling organic solvent.

11. The ink set according to claim 1, wherein each ink contains 1 to 20 wt % penetration promoter.

12. The ink set according to claim 1, wherein each ink contains 0.1 to 5 wt % acetylene glycol and/or silicone compound.

13. A recording method for forming an image by using the ink set according to claim 1.

14. A recording system for forming an image by using the ink set according to claim 1.

15. Recorded matter comprising an image formed by using the ink set according to claim 1.

* * * * *

UNITED STATES PATENT AND TRADEMARK OFFICE
CERTIFICATE OF CORRECTION

PATENT NO.       : 7,600,864 B2                                    Page 1 of 1
APPLICATION NO.  : 10/494682
DATED            : October 13, 2009
INVENTOR(S)      : Shuichi Kataoka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 582 days.

Signed and Sealed this

Fifth Day of October, 2010

David J. Kappos
*Director of the United States Patent and Trademark Office*